(12) United States Patent
Handelman

(10) Patent No.: US 6,574,018 B1
(45) Date of Patent: Jun. 3, 2003

(54) NETWORK CONTROL SYSTEM FOR OPTICAL COMMUNICATION NETWORKS

(76) Inventor: Doron Handelman, 14 Hamaavak Street, 53520 Givatayim (IL)

( * ) Notice: Subject to any disclaimer, the term of this patent is extended or adjusted under 35 U.S.C. 154(b) by 0 days.

(21) Appl. No.: 09/389,345

(22) Filed: Sep. 3, 1999

(30) Foreign Application Priority Data

Mar. 17, 1999 (IL) ................................................ 129031

(51) Int. Cl.⁷ ................................................ H04J 14/02
(52) U.S. Cl. ........................ 359/124; 359/125; 370/280
(58) Field of Search ................................ 359/124, 125, 359/176; 455/78, 80; 370/280, 294

(56) References Cited

U.S. PATENT DOCUMENTS

| | | | |
|---|---|---|---|
| 4,626,075 A | 12/1986 | Chemla | |
| 5,170,273 A | 12/1992 | Nishio | |
| 5,191,457 A | 3/1993 | Yamazaki | |
| 5,194,977 A | 3/1993 | Nishio | |
| 5,400,322 A | 3/1995 | Hunt et al. | |
| 5,452,115 A | 9/1995 | Tomioka | |
| 5,457,687 A | 10/1995 | Newman | |
| 5,479,447 A | 12/1995 | Chow et al. | |
| 5,557,439 A | 9/1996 | Alexander et al. | |
| 5,680,490 A | 10/1997 | Cohen et al. | |
| 5,712,932 A | 1/1998 | Alexander et al. | |
| 5,724,167 A | 3/1998 | Sabella | |
| 5,739,935 A | 4/1998 | Sabella | |
| 5,774,244 A | 6/1998 | Tandon et al. | |
| 5,867,289 A | 2/1999 | Gerstel et al. | |
| 6,108,112 A | 8/2000 | Touma | |
| 6,233,082 B1 | 5/2001 | Johnson | |
| 6,374,087 B1 * | 4/2002 | Gressent et al. | 455/78 |

OTHER PUBLICATIONS

Wavelength Assignment in Multishop Lightwave Networks, Aura Ganz et al, IEEE Transactions on Communications, vol. 42, No. 7, Jul. 1994, pp. 246–2469.

Wavelength–Division Switching Technology in Photonic Switching Systems, Suzuki et al, IEEE International Conference on Communications, ICC 1990, pp. 1125–1129.

Branch–Exchange Sequences for Reconfiguration of Lightwave Networks, Labourdette et al, IEEE Transactions on Communications, vol. 42, No. 10, Oct. 1994, pp. 2822–2832.

Use of Delegated Tuning and Forwarding in Wavelength Division Multiple Access Networks, Auerbach et al, IEEE Transactions on Communications, vol. 43, No. 1, Jan. 1995, pp. 52–63.

Optical amplifiers Revolutionize communcations, Laser Focus World, Sep. 1998, pp. 28–32.

Ombining Gratings and Filters Reduces WDM Channel Spacing, Optoelectronics World, Sep. 1998, pp. S11–S17.

Mining the Optical Bandwidth for a Terabit per second, Alan Wilner, IEEE Spectrum, Apr. 1997, pp. 32–41.

Record data–transmission rate reported at ECOC '96, Laser Focus World, Nov. 1996, pp. 40–42.

Multiple Wavelengths Exploit Fiber Capacity, Eric Lerner, Laser Focus World, Jul. 1997, pp. 119–125.

Advances in Dense WDM push diode–laser design, Diana Zankowsky, Laser Focus World, Aug. 1997, pp. 167–171.

(List continued on next page.)

Primary Examiner—John Tweel

(57) ABSTRACT

A network control system may be embodied in various elements of a communication network which communicates optical signals multiplexed by wavelength division multiplexing (WDM). In a preferred embodiment of the invention, the network control system limits a number of channel wavelengths actually used for communicating the optical signals to an end node to a highest number N of separable channel wavelengths at the end node. In another preferred embodiment of the invention, the network control system controls and modifies, as necessary, data rates carried over channel wavelengths multiplexed by WDM in order to reduce interference and improve performance of the communication network.

21 Claims, 12 Drawing Sheets

OTHER PUBLICATIONS

Multistage Amplifier Provides gain across 80 nm, pp. 22–23.

Optical Switching promises cure for telecommunications logjam, Jeff Hecht, Laser Focus World, Sep. 1998, pp. 69–72.

The Communications Handook, Jeffrey Gibson, 1997, pp. 883–890.

WDM Local Area Networks, Kazovsky et al, IEEE LTS, May 1992, pp. 8–15.

Optical Switches Ease Bandwidth Crunch, EuroPhotonics, Rien Flipse, Aug./Sep. 1998, pp. 44–45.

Speed Demons: Is Faster Better and Cheaper? Stephanie Weiss, Photonics Spectra, Feb. 1999 pp. 96–102.

Wavelength Lockers Keep Lasers in Line, Ed Miskovic, Photonics Spectra, Feb. 1999, pp. 104–110.

Optical Switches Pursue Crossconnect Markets, Hassaun Jones–Bey, Laser Focus World, May 1998, pp. 153–162.

Demand Triggers Advances in Dense WDM Components, Raymond Nering, Optoelectronics World, Sep. 1998, pp. S5–S8.

Optical Networks, Hector Escobar, Photonics Spectra, Dec. 1998, pp. 163–167.

Ultrafast Optical Switch Unveiled, Photonics Spectra, Michael Wheeler, Dec. 1998, p. 42.

Data Express, Gigabit Junction with the next–generation Internet, John Collins et al, IEEE Spectrum, Feb. 1999, pp. 18–25.

Designing Broadband Fiber Optic Communications Systems, Juan Lam, Communication Systems Design, Feb. 1999.

Terabit–transmission demonstration make a splash at OFC '96, Laser Focus World, Apr. 1996, p. 13.

Multigigabit Networks: The Challenge, Claude Rolland et al, IEEE LTS, May 1992, pp. 16–26.

Direct Detection Lightwave Systems: Why Pay More?, Paul Green et al, IEEE LCS, Nov. 1990, pp. 36–49.

Photonics in Switching, Scott Hinton, IEEE LTS, Aug. 1992, pp. 26–35.

Advanced Technology for Fiber Optic Subscriber Systems, Hiromu Taba et al, IEEE LTS, Nov. 1992, pp. 12–18.

Fiber Amplifiers Expand Networks Capacities, Eric Lerner, Laser Focus World, Aug. 1997, pp. 85–96.

Technologies for Local–access Fibering, Yukou Mochida, IEEE Communications Magazine, Feb. 1994, pp. 64–72.

\* cited by examiner

NETWORK CONTROL SYSTEM FOR OPTICAL COMMUNICATION NETWORKS

FIELD OF THE INVENTION

The present invention relates to optical communication networks generally, and more particularly to optical communication networks which utilize wavelength division multiplexing.

BACKGROUND OF THE INVENTION

Today, a growing demand for telecommunication services is experienced by the telecommunication industry and the demand is further expected to grow in the future. One of the ways to meet such demand is by expanding capacity of information carried over fiber optic cables in optical communication systems through use of wavelength division multiplexing (WDM).

The use of WDM enables simultaneous transmission of multiple signals at different wavelengths over the same fiber optic cable. The multiple signals at the different wavelengths are combined and transmitted in a combined form along the fiber optic cable to a receiving end. At the receiving end the multiple signals are received and separated, and the data carried over each separate channel wavelength is regenerated.

Basic elements of a WDM based system, such as wide band optical amplifiers, multiplexers/demultiplexers, optical transmitters, optical receivers and tunable optical filters, exist today and are commercially available. However, there are still several network control and management problems that have to be resolved in order to provide efficient WDM based optical communication networks.

Some aspects of technologies and art related to WDM based optical communication systems and to elements of WDM based optical communication systems are described in the following publications:

an article titled "Mining the Optical Bandwidth for a Terabit per Second", by Alan Eli Willner, in IEEE Spectrum, April 1997, pp. 32–41;

an article titled "Record Data Transmission Rate Reported at ECOC 96", by Paul Mortensen, Laser Focus World, November 1996, pp. 40–42;

an article titled "Multiple Wavelengths Exploit Fiber Capacity", by Eric J. Lerner, Laser Focus World, July 1997, pp. 119–125;

an article titled "Advances in Dense WDM Push Diode-Laser Design", by Diana Zankowsky, Laser Focus World, August 1997, pp. 167–172;

an article titled "Multistage Amplifier Provides Gain Across 80 nm", by Kristin Lewotesky, Laser Focus World, September 1997, pp. 22–24;

an article titled "Optical switching promises cure for telecommunications logjam", by Jeff Hecht, Laser Focus World, September 1998;

The Communications Handbook, CRC Press & IEEE Press, 1997, Editor-in-Chief Jerry D. Gibson, Section 65, pp. 883–890;

an article titled "WDM Local Area Networks", by Kazovsky et al., IEEE LTS, May 1992, pp. 8–15;

an article titled "Optical Switches Ease Bandwidth Crunch", by Rien Flipse, EuroPhotonics, August/September 1998, pp. 44–45;

an article titled "Speed Demons: Is "Faster Better and Cheaper?", by Stephanie A. Weiss, Photonics Spectra, February 1999, pp. 96–102;

an article titled "Wavelength Lockers Keeps Lasers in Line", by Ed Miskovic, Photonics Spectra, February 1999, pp. 104–110;

an article titled "Optical switches pursue crossconnect markets", by Hassaun Jones-Bay, Laser Focus World, May 1998, pp. 153–162;

a conference review titled "Optical amplifiers revolutionize communications", Laser Focus World, September 1998, pp. 28–32;

an article titled "Combining gratings and filters reduces WDM channel spacing", by J. J. Pan and Y. Shi, Optoelectronics World, September 1998, pp. S11–S17;

an article titled "Demand triggers advances in dense WDM components", by Raymond Nering, Optoelectronics World, September 1998, pp. S5–S8;

an article titled "Optical Networks Seek Reconfigurable Add/Drop Options", by Hector E. Escobar, Photonics Spectra, December 1998, pp. 163–167;

an article titled "Ultrafast Optical Switch Unveiled", by Michael D. Wheeler, Photonics Spectra, December 1998, pp. 42;

an article titled "Data express Gigabit junction with the next-generation Internet", by John C. Collins, Joel Dunn, Phil Emer and Mark Johnson, IEEE Spectrum February 1999, pp. 18–25; and an article titled "Designing Broadband Fiber Optic Communication Systems", by Juan F. Lam, Communication Systems Design, February 1999.

Additionally, in U.S. Pat. No. 5,170,273 to Nishio there is described a cross-talk reducing optical switching system which receives electrical digital signals at its input terminal.

U.S. Pat. No. 5,191,457 to Yamazaki describes a WDM optical communication network in which optical beams are modulated by channel discrimination signals of different frequencies.

U.S. Pat. No. 5,194,977 to Nishio describes a wavelength division switching system with reduced optical components using optical switches.

U.S. Pat. No. 5,557,439 to Alexander et al. describes wavelength division multiplexed optical communication systems configured for expansion with additional optical signal channels.

U.S. Pat. No. 5,680,490 to Cohen et al. describes a comb splitting system which demultiplexes and/or multiplexes a plurality of optical signal channels at various wavelengths.

U.S. Pat. No. 5,712,932 to Alexander et al. describes reconfigurable wavelength division multiplexed systems which include configurable optical routing systems.

U.S. patent application Ser. No. 09/126,378 filed on Jul. 30, 1998, now U.S. Pat. No. 6,404,522, describes improvements in communication performance of an optical communication system which communicates data via N different channel wavelengths using WDM.

The disclosures of all references mentioned above and throughout the present specification are hereby incorporated herein by reference.

SUMMARY OF THE INVENTION

The present invention seeks to improve performance of WDM based communication networks.

In the present invention, a network control system may be used to control and manage communication and to improve communication performance of a communication network. In a preferred embodiment of the present invention, the network control system is embodied in a node serving terminal and is employed to limit a number of channel wavelengths actually used for substantially simultaneously communicating the optical signals via a fiber optic cable to an end node to a highest number N of separable channel wavelengths at the end node. Thus, channel wavelengths that cannot be separated at the end node due to, for example, limitations of separation equipment at the end node, are not used for communication with the end node and are therefore not able to generate crosstalk among channel wavelengths or other types of interference which may degrade communication performance.

The network control system may include a passive element, such as a filter, to limit the number of channel wavelengths actually used for communication. The filter may block transmission of channel wavelengths outside a selected pass-band, or a few selected pass-bands. Channel wavelengths of optical signals carried over channel wavelengths which are not transmitted by the filter may be reflected and converted to at least one channel wavelength within at least one pass-band transmitted by the filter thereby forming converted optical signals.

The converted optical signals may be transmitted via a separate route to another node serving terminal which may communicate the converted optical signals to the end node via a separate link and a separate route.

Alternatively, the converted optical signals may be transmitted to the end node over the at least one channel wavelength within the at least one pass-band transmitted by the filter after a delay time period. The delay time period may be provided by a delay generator.

Further alternatively, the converted optical signals may be combined with non-converted optical signals carried over the N channel wavelengths and transmitted in a combined form to the end node if a data rate of data carried over each of the N channel wavelengths resulting from the combination of the converted optical signals with the non-converted optical signals does not exceed a channel data rate threshold determined, for example, by a maximum channel capacity.

The network control system may alternatively include a controller which actively limits the number of channel wavelengths actually used for communication. When the highest number N of separable channel wavelengths at the end node is determined, the controller selects N channel wavelengths which may be used for communication with the end node, and prevents communication with the end node over channel wavelengths other than the N channel wavelengths. Preferably, channel wavelengths of optical signals carried over channel wavelengths which are not selected by the controller may be converted to at least one channel wavelength selected by the controller thereby to form converted optical signals. The converted optical signals may be treated in a similar manner as mentioned above.

It is appreciated that since one of the parameters which determine communication performance of a WDM based optical communication network is the density of channel wavelengths multiplexed by WDM, limitation of a number of channel wavelengths actually used for communicating optical signals to an end node of a WDM based optical network may improve performance of the WDM based optical communication network.

In another preferred embodiment of the present invention a network control system may control and/or modify, as necessary, data rates of data carried over N channel wavelengths multiplexed by WDM and/or an arrangement of the data carried over the N channel wavelengths in order to reduce interference and improve performance of a communication network.

Preferably, the network control system includes a controller which determines a first distribution of the N channel wavelengths in which K out of the N channel wavelengths are each characterized by the following characteristics: (a) each of the K channel wavelengths carries data at a data rate which is higher than a threshold; and (b) each of the K channel wavelengths is spaced apart a channel spacing S from at least one of the K channel wavelengths which is a nearest neighbor. The controller then produces a second distribution of the N channel wavelengths in which the number of channel wavelengths having the above mentioned characteristics is less than K. Then a router in the network control system reroutes the data from the N channel wavelengths of the first distribution to the N channel wavelengths of the second distribution. Thus, at least some of the channel wavelengths which carry data at data rates higher than the threshold are spaced apart a channel spacing which is greater than S thereby reducing interference among channel wavelengths carrying data at data rates higher than the threshold.

Alternatively, the network control system may reduce a data rate of data carried over selected channel wavelengths. A sequence of the N channel wavelengths is preferably determined in an increasing or a decreasing order so that an even channel number or an odd channel number is assigned to each of the N channel wavelengths. Then, data rates may be reduced either for data carried over channel wavelengths having the odd channel numbers or for data carried over channel wavelengths having the even channel numbers, in each case with respect to data rates of data carried over channel wavelengths which are nearest neighbors. Thus, channel wavelengths carrying data at data rates which are not reduced, i.e., channel wavelengths having even channel numbers or channel wavelengths having odd channel numbers respectively, are less interfered.

Further alternatively, the network control system may determine data rates carried over each of the N channel wavelengths, and equalize data rates carried over channel wavelengths in at least a sub-group of the N channel wavelengths with respect to each other in the sub-group up to a data rate difference level within a predetermined equalization range. Since a quality of communication over a channel wavelength is dependent upon a data rate of data carried over the channel wavelength, equalization of data rates carried over the at least a sub-group of the N channel wavelengths may be used to improve the quality of communication.

The network control system may be also employed to control transmission of optical signals multiplexed by WDM to an end node of the communication network. Preferably, first optical signals carried over $K_1$ channel wavelengths, and second optical signals carried over $K_2$ channel wavelengths which are different from the $K_1$ channel wavelengths are received at routing apparatus. However, only the $K_1$ channel wavelengths are used for communication with the end node.

Preferably, a wavelength converter unit which is operatively associated with the routing apparatus changes the $K_2$ channel wavelengths of the second optical signals to at least one of the $K_1$ channel wavelengths thereby to form converted optical signals. Then, a transmitter unit which is operatively associated with the routing apparatus, transmits the converted optical signals to the end node in one of the following transmission modes: (a) together with the first optical signals and over the $K_1$ channel wavelengths if a combination of the converted optical signals and the first optical signals does not exceed a channel data rate threshold on each of the $K_1$ channel wavelengths, and (b) after transmission of the first optical signals and over the at least one of the $K_1$ channel wavelengths if a combination of the converted optical signals and the first optical signals exceeds the channel data rate threshold on the at least one of the $K_1$ channel wavelengths.

There is thus provided in accordance with a preferred embodiment of the present invention a network control method for use with a communication network in which a node serving terminal (NST) communicates optical signals multiplexed by WDM with an end node via a fiber optic cable, the method including determining a highest number N of separable channel wavelengths at the end node, and limiting a number of channel wavelengths actually used for substantially simultaneously communicating the optical signals via the fiber optic cable to the end node to the number N.

Preferably, the determining step includes the steps of obtaining the number of channel wavelengths N at one of the NST and the end node upon installation of channel wavelength separating equipment at a service area of the end node, and providing the number of channel wavelengths N to the NST if the number of channel wavelengths N is obtained at the end node. Alternatively, the determining step preferably includes the step of transmitting control information including a determination of the number N from the end node to the NST.

Preferably, the limiting step includes the step of filtering channel wavelengths routed to the end node to enable substantially simultaneous transmission of no more than N channel wavelengths in total within at least one bandwidth. Additionally, the method also includes the step of converting at least one channel wavelength outside the at least one bandwidth to at least one of the N channel wavelengths.

The limiting step may also preferably include the steps of transmitting optical signals carried over up to N channel wavelengths from the NST to the end node, changing channel wavelengths of optical signals carried over channel wavelengths other than the N channel wavelengths to at least one of the N channel wavelengths thereby to form converted optical signals, and transmitting the converted optical signals over the at least one of the N channel wavelengths from the NST to the end node after the step of transmitting optical signals carried over up to N channel wavelengths from the NST to the end node.

Alternatively, the limiting step may preferably include the steps of determining N channel wavelengths to be actually used for substantially simultaneously communicating the optical signals to the end node via the fiber optic cable, changing channel wavelengths of optical signals carried over channel wavelengths other than the N channel wavelengths to at least one of the N channel wavelengths thereby to form converted optical signals, combining the converted optical signals carried over the at least one of the N channel wavelengths and optical signals carried over the N channel wavelengths to form combined optical signals, and transmitting the combined optical signals over the N channel wavelengths from the NST to the end node.

There is also provided in accordance with a preferred embodiment of the present invention a network control method for use with a communication network utilizing WDM of N channel wavelengths carrying data at various data rates and having the channel wavelengths spaced apart a channel spacing S from each other, the method including determining a first distribution of the N channel wavelengths in which K out of the N channel wavelengths are each characterized by the following characteristics: (a) each of the K channel wavelengths carries data at a data rate which is higher than a threshold, and (b) each of the K channel wavelengths is spaced apart the channel spacing S from at least one of the K channel wavelengths which is a nearest neighbor, producing a second distribution of the N channel wavelengths in which the number of channel wavelengths having the characteristics is less than K, and communicating the data over the N channel wavelengths of the second distribution.

In accordance with another preferred embodiment of the present invention there is also provided a network control method for use with a communication network utilizing WDM of N channel wavelengths carrying data at various data rates, the method including detecting an interference between at least two of the N channel wavelengths, determining a sequence of the N channel wavelengths having odd channel wavelengths and even channel wavelengths, and reducing one of the following: (a) a data rate of data carried over at least one odd channel wavelength in the sequence of the N channel wavelengths with respect to a data rate of data carried over even channel wavelengths which are nearest neighbors to the at least one odd channel wavelength in the sequence of the N channel wavelengths, and (b) a data rate of data carried over at least one even channel wavelength in the sequence of the N channel wavelengths with respect to a data rate of data carried over odd channel wavelengths which are nearest neighbors to the at least one even channel wavelength in the sequence of the N channel wavelengths.

Preferably, the reducing step includes the step of reducing the data rate until interference between the at least two of the N channel wavelengths falls below an acceptable interference level.

Further in accordance with a preferred embodiment of the present invention there is provided a network control method for use with a communication network utilizing WDM of N channel wavelengths carrying data at various data rates, the method including determining data rates carried over each of the N channel wavelengths, and equalizing data rates carried over channel wavelengths in at least a sub-group of the N channel wavelengths with respect to each other in the sub-group up to a data rate difference level within a predetermined equalization range.

Preferably, the equalizing step includes the step of transferring data from at least a first channel wavelength in the sub-group which carries data at a first data rate to at least a second channel wavelength in the sub-group which carries data at a second data rate being lower than the first data rate until a difference between a data rate of data carried over the at least a first channel wavelength and a data rate of data carried over the at least a second channel wavelength is within the predetermined equalization range.

There is also provided in accordance with a preferred embodiment of the present invention a network control system in a node serving terminal which communicates optical signals multiplexed by wavelength division multiplexing with an end node via a fiber optic cable, the network control system including routing apparatus capable of substantially simultaneously communicating the optical signals over a plurality of channel wavelengths via the fiber optic cable, and limiting apparatus, operatively associated with the routing apparatus, and operative to limit a number of channel wavelengths actually used by the routing apparatus for substantially simultaneously communicating the optical signals to the end node via the fiber optic cable to a highest number N of separable channel wavelengths at the end node.

Preferably, the limiting apparatus includes a bandpass filter substantially transparent only to optical signals transmitted over up to N channel wavelengths in total within at least one bandwidth. Alternatively, the limiting apparatus includes a controller operative to select N channel wavelengths from the plurality of channel wavelengths, and to prevent routing of channel wavelengths other than the N channel wavelengths together with the N channel wavelengths.

Additionally, the limiting apparatus also includes one of the following routers: an N-channel router operatively associated with the controller and operative to substantially simultaneously route up to N channel wavelengths, and a router operatively associated with the controller and operative to substantially simultaneously route a number of channel wavelengths determined by the controller.

Preferably, the system also includes a wavelength converter unit operative to convert at least one of the plurality of channel wavelengths not included in the N channel wavelengths to at least one of the N channel wavelengths.

In accordance with a preferred embodiment of the present invention there is also provided a network control system in a communication network utilizing WDM of N channel wavelengths carrying data at various data rates and having the channel wavelengths spaced apart a channel spacing S from each other, the system including a controller including: determination apparatus operative to determine a first distribution of the N channel wavelengths in which K out of the N channel wavelengths are each characterized by the following characteristics: (a) each of the K channel wavelengths carries data at a data rate which is higher than a threshold, and (b) each of the K channel wavelengths is spaced apart the channel spacing S from at least one of the K channel wavelengths which is a nearest neighbor, and a processing unit, operatively associated with the determination apparatus, and operative to produce a second distribution of the N channel wavelengths in which the number of channel wavelengths having the characteristics is less than K, and a router operatively associated with the controller and operative to reroute the data from the N channel wavelengths of the first distribution to the N channel wavelengths of the second distribution.

There is also provided in accordance with another preferred embodiment of the present invention a network control system in a communication network utilizing WDM of N channel wavelengths carrying data at various data rates, the system including a detector unit operative to detect an interference between at least two of the N channel wavelengths, determination apparatus operative to determine a sequence of the N channel wavelengths having odd channel wavelengths and even channel wavelengths, and a processing unit operatively associated with the determination apparatus and the detector unit and operative to cause a reduction of one of the following: (a) a data rate of data carried over at least one odd channel wavelength in the sequence of the N channel wavelengths with respect to a data rate of data carried over even channel wavelengths which are nearest neighbors to the at least one odd channel wavelength in the sequence of the N channel wavelengths, and (b) a data rate of data carried over at least one even channel wavelength in the sequence of the N channel wavelengths with respect to a data rate of data carried over odd channel wavelengths which are nearest neighbors to the at least one even channel wavelength in the sequence of the N channel wavelengths.

Further in accordance with a preferred embodiment of the present invention there is also provided a network control system in a communication network utilizing WDM of N channel wavelengths carrying data at various data rates, the system including determination apparatus operative to determine data rates carried over each of the N channel wavelengths, and a processing unit operatively associated with the determination apparatus and operative to equalize data rates carried over channel wavelengths in at least a sub-group of the N channel wavelengths with respect to each other in the sub-group up to a data rate difference level within a predetermined equalization range.

In accordance with yet another preferred embodiment of the present invention there is also provided a network control system for controlling transmission of optical signals multiplexed by WDM to an end node of a communication network, the system including routing apparatus operative to receive first optical signals carried over $K_1$ channel wavelengths, and second optical signals carried over $K_2$ channel wavelengths which are different from the $K_1$ channel wavelengths, a wavelength converter unit operatively associated with the routing apparatus and operative to change the $K_2$ channel wavelengths of the second optical signals to at least one of the $K_1$ channel wavelengths thereby to form converted optical signals, and a transmitter unit operatively associated with the routing apparatus and operative to transmit the converted optical signals to the end node in one of the two following transmission modes: (a) together with the first optical signals and over the $K_1$ channel wavelengths if a combination of the converted optical signals and the first optical signals does not exceed a channel data rate threshold on each of the $K_1$ channel wavelengths, and (b) after transmission of the first optical signals and over the at least one of the $K_1$ channel wavelengths if a combination of the converted optical signals and the first optical signals exceeds the channel data rate threshold on the at least one of the $K_1$ channel wavelengths.

There is also provided in accordance with yet another preferred embodiment of the present invention a network control method for controlling transmission of optical signals multiplexed by wavelength division multiplexing to an end node of a communication network, the method including receiving first optical signals carried over $K_1$ channel wavelengths, and also receiving second optical signals carried over $K_2$ channel wavelengths which are different from the $K_1$ channel wavelengths, changing the $K_2$ channel wavelengths of the second optical signals to at least one of the $K_1$ channel wavelengths thereby to form converted optical signals, and transmitting the converted optical signals to the end node in one of the two following transmission modes: (a) together with the first optical signals and over the $K_1$ channel wavelengths if a combination of the converted optical signals and the first optical signals does not exceed a channel data rate threshold on each of the $K_1$ channel wavelengths, and (b) after transmission of the first optical signals and over the at least one of the $K_1$ channel wavelengths if a combination of the converted optical signals and the first optical signals exceeds the channel data rate threshold on the at least one of the $K_1$ channel wavelengths.

In accordance with a preferred embodiment of the present invention there is provided a delay generator including an optical converter operative to convert incoming optical signals to electronic signals, a circular buffer operatively associated with the optical converter and operative to receive the electronic signals and to output electronic signals delayed by a delay time period, and an electronic converter operatively associated with the circular buffer and operative to convert the electronic signals delayed by the delay time period to a delayed replica of the incoming optical signals.

Further in accordance with a preferred embodiment of the present invention there is provided a delay generator for delaying optical signals, the delay generator including a plurality of delay segments connected in series, each delay segment including: a fiber optic cable of predetermined length operative to pass the optical signals, a beam-splitter coupled to the fiber optic cable and operative to transmit and reflect the optical signals at selected proportions, and a coupler for coupling the delay segment to a fiber optic cable of an adjacent delay segment, and a segment selector for directing optical signals emanating from a beam-splitter of a selected segment to an output port.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
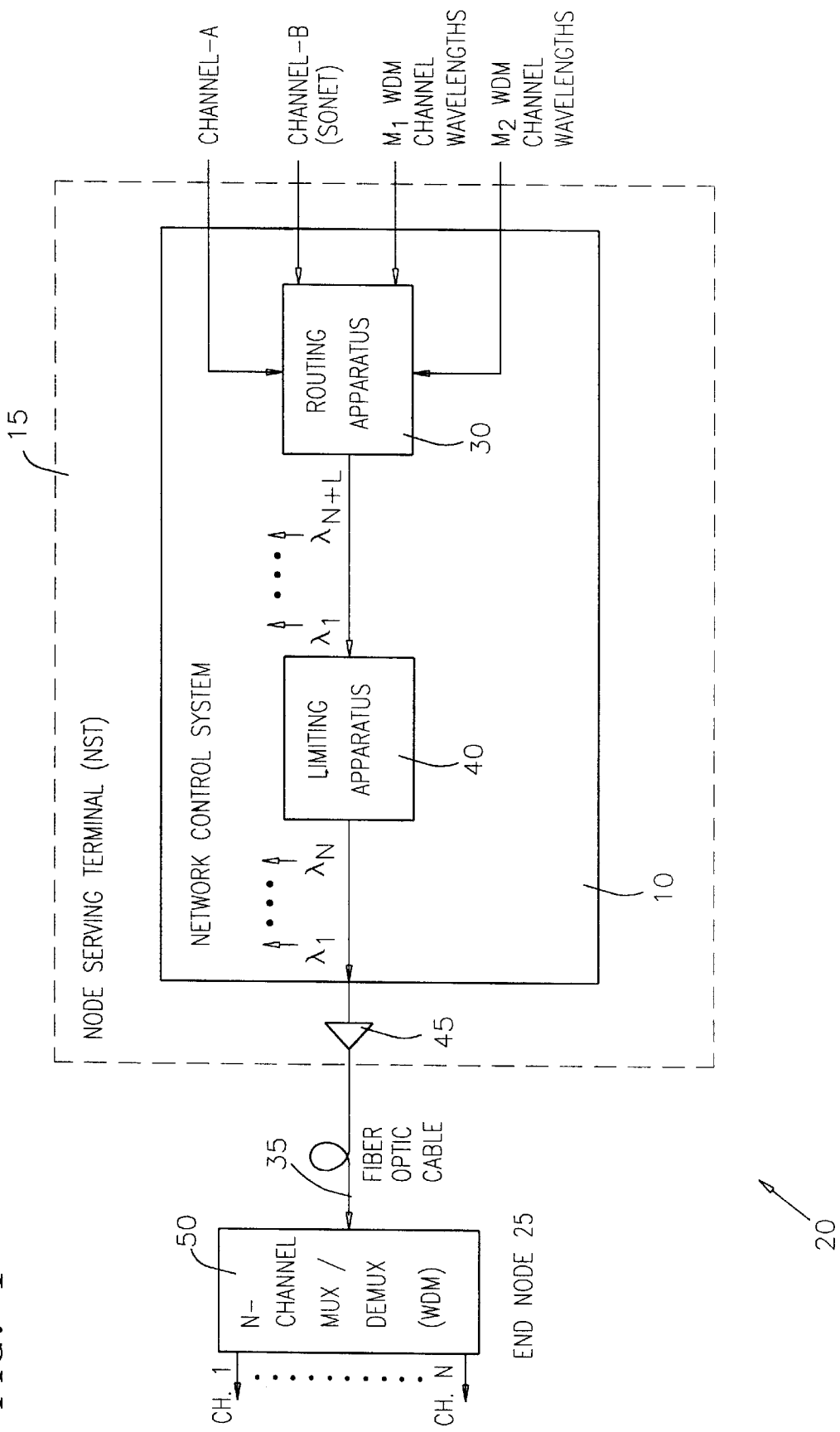
FIG. 1 is a simplified block diagram illustration of a preferred implementation of a network control system in a node serving terminal of a communication network, the network control system being constructed and operative in accordance with a preferred embodiment of the present invention.

Reference is now made to FIG. 1 which is a simplified block diagram illustration of a preferred implementation of a network control system 10 in a node serving terminal 15 of an optical communication network 20, the network control system 10 being constructed and operative in accordance with a preferred embodiment of the present invention.

The term "node serving terminal" or "NST" is used throughout the specification and claims to include central terminal equipment which communicates along a line with a plurality of down-the-line units in an optical communication network, wherein the line typically defines a communication path, and each down-the-line unit is closer to an associated subscriber terminal of the optical communication network than the central terminal equipment. Thus, the NST may include a central office terminal (COT) having conventional central office equipment which communicates with a plurality of hubs or end nodes, or a hub which communicates with a plurality of optical network units (ONUs), or an ONU which communicates with a plurality of end nodes or subscriber terminals. Alternatively or additionally, the NST may include a COT which communicates with a plurality of computer networks, such as local-area-networks (LANs), metropolitan-area-networks (MANs), and wide-area-networks (WANs), or a server terminal which communicates with a plurality of remote terminals in a computer network.

The term "end node" is used throughout the specification and claims to include a down-the-line unit which communicates along the line with an NST in an optical communication network, the down-the-line unit being closer to an associated subscriber terminal of the optical communication network than the NST. Thus, the end node may include a hub which communicates with a COT, or an ONU which communicates with a hub, or a subscriber terminal which communicates with an ONU or directly with a COT. It is appreciated that the end node is referred to as typically having channel separating apparatus for a whole end node service area although some channel separating elements may be embodied in other units, such as at the subscriber terminal. Alternatively or additionally, the end node may include a computer network which communicates with a COT, or a remote terminal, such as a personal computer or a workstation, which communicates with a server terminal in a computer network.

Preferably, the NST 15 receives input data via a plurality of channels and channel wavelengths from various data sources (not shown), and switches and routes the data to addressed destinations. For simplicity, FIG. 1 and the description provided herein below with reference to FIG. 1 refer only to one of the destinations, indicated as an end node 25, but it is appreciated that the NST 15 may communicate with additional end nodes.

The plurality of channels and channel wavelengths over which the data is received at the NST 15 may include, for example, several groups of channel wavelengths multiplexed by wavelength division multiplexing, such as a first group of $M_1$ channel wavelengths multiplexed by WDM, and a second group of $M_2$ channel wavelengths multiplexed by WDM. Additionally, the plurality of channels and channel wavelengths may include an optical channel carrier B carrying optical signals, for example, in SONET (Synchronous Optical Network) frames.

It is appreciated that in a case that the optical communication network 20 includes a hybrid communication network, such as a hybrid coax-fiber optic communication network (not shown), the NST 15 may also receive an electronic channel carrier A carrying electronic signals which may be converted to optical signals as described herein below.

The term "wavelength division multiplexing" or "WDM" is used throughout the specification and claims in a broad sense to include wavelength division multiplexing of a plurality of channel wavelengths within any suitable wavelength range. Specifically, WDM is used throughout the specification and claims to include wavelength division multiplexing of two channel wavelengths, wavelength division multiplexing of more than two and up to tens of channel wavelengths for which the term "dense WDM" (DWDM) is typically used, and wavelength division multiplexing of tens to hundreds of channels for which the term optical frequency division multiplexing (OFDM) is typically used. Wavelength ranges typically suitable for WDM include ranges of the order of tens of nanometers (nms) around each of the following wavelengths: 780 nm; 980 nm; 1310 nm; 1480 nm; 1550 nm; and 1620 nm. It is appreciated that wavelengths in different wavelength ranges may be also multiplexed by WDM.

Preferably, the plurality of channels and channel wavelengths over which the input data is received at the NST 15 are fed to routing apparatus 30 in the network control system 10. The routing apparatus 30 may include conventional switching and routing equipment which preferably makes the routing apparatus 30 capable of substantially simultaneously communicating optical signals over a plurality of channel wavelengths via a fiber optic cable 35 to the end node 25.

In the case that the optical communication network 20 includes a hybrid communication network as mentioned above, the routing apparatus 30 may also include lasers (not shown) which may be modulated by the electronic signals carried over the channel carrier A to thereby convert the electronic signals to optical signals which may be multiplexed by WDM with other optical signals and outputted by the routing apparatus 30.

Preferably, multiplexed optical signals outputted by the routing apparatus 30 are directed to the end node 25 over a plurality of channel wavelengths, such as N+L channel wavelengths indicated by $\lambda_1, \ldots, \lambda_{N+L}$, where N and L are integer numbers. The optical signals carried over the N+L channel wavelengths $\lambda_1, \ldots, \lambda_{N+L}$ are preferably fed to limiting apparatus 40 which is operatively associated with the routing apparatus 30, and is operative to limit a number of channel wavelengths actually used by the routing apparatus 30 for substantially simultaneously communicating the optical signals to the end node 25 via the fiber optic cable 35 to a highest number N of separable channel wavelengths at the end node 25. Thus, only optical signals carried over N channel wavelengths, for example, $\lambda_1, \ldots, \lambda_N$, which may be actually separated at the end node 25, are actually transmitted to the end node 25 over the fiber optic cable 35. Typically, the optical signals carried over the N channel wavelengths which are outputted by the limiting apparatus 40 are amplified by a conventional fiber amplifier 45, such as an Erbium-doped-fiber-amplifier (EDFA) for wavelengths around 1550 nm.

At the end node 25, the optical signals carried over the N channel wavelengths are separated by a multiplexer/demultiplexer (MUX/DEMUX) 50, and routed, over N separate channels indicated by CH. 1, . . . , CH. N, to intended destinations (not shown).

Preferably, the NST 15 may communicate with the end node 25 in duplex communication. However, for simplicity, only communication in a direction from the NST 15 to the end node 25 is shown in FIG. 1 and referred to herein below.

The operation of the apparatus of FIG. 1 is now briefly described. Typically, the NST 15 may serve a plurality of end nodes, and therefore the routing apparatus 30 typically includes equipment which enables it to handle and multiplex by WDM a larger number of channel wavelengths than the MUX/DEMUX 50 at the end node 25 may separate. It is appreciated that the difference between the number of separable channel wavelengths at the NST 15 and at each of the end nodes also exists because the cost sensitivity of equipment at the end nodes is high with respect to cost sensitivity of equipment at the NST 15.

Due to the difference in the number of separable channel wavelengths at the NST 15 and the end node 25, there may be cases in which the routing apparatus 30 may route to the end node 25 more channel wavelengths than the MUX/DEMUX 50 may separate. In such cases, the number of channel wavelengths actually used by the NST 15 must be limited by the limiting apparatus 40 otherwise data carried over channel wavelengths that are not separated at the end node 25 may be lost, and the probability of crosstalk among channel wavelengths and other types of interference may increase.

The term "interference" is used throughout the specification and claims to include any effect which causes degradation of communication performance, for example, crosstalk among channel wavelengths, self-phase modulation, four-wave mixing, and wavelength instability of channel wavelengths. It is appreciated that interference may be determined, for example, by a bit-error-rate (BER) measurement on each channel wavelength.

The limiting apparatus 40 is thus preferably employed to avoid transmission of data over more channel wavelengths than the end node 25 may separate and to reduce interference effects. Preferably, upon installation of the MUX/DEMUX 50 at the end node 25, and/or other channel wavelength separating equipment down-the-line from the end node 25, the total number of channel wavelengths that may be separated at the end node 25 and down-the-line from the end node 25, i.e., the number N, may be obtained either at the NST 15 or at the end node 25. It is appreciated that if the number N is obtained at the end node 25 it is preferably provided to the NST 15, such as by transmitting control information including a determination of the number N from the end node 25 to the NST 15. The control information including the determination of the number N may be transmitted over a control channel (not shown) either via the fiber optic cable 35 or via other means (not shown), such as a coaxial cable (not shown).

Once the number N is obtained, an adjustment of the limiting apparatus 40 at the NST 15 is preferably performed so as to limit the actual number of channel wavelengths used for substantially simultaneously communicating optical signals to the end node 25 to N channel wavelengths. The adjustment of the limiting apparatus 40 may be performed by employing one of the apparatuses described herein below with reference to FIGS. 2 and 3.

Figure 2:
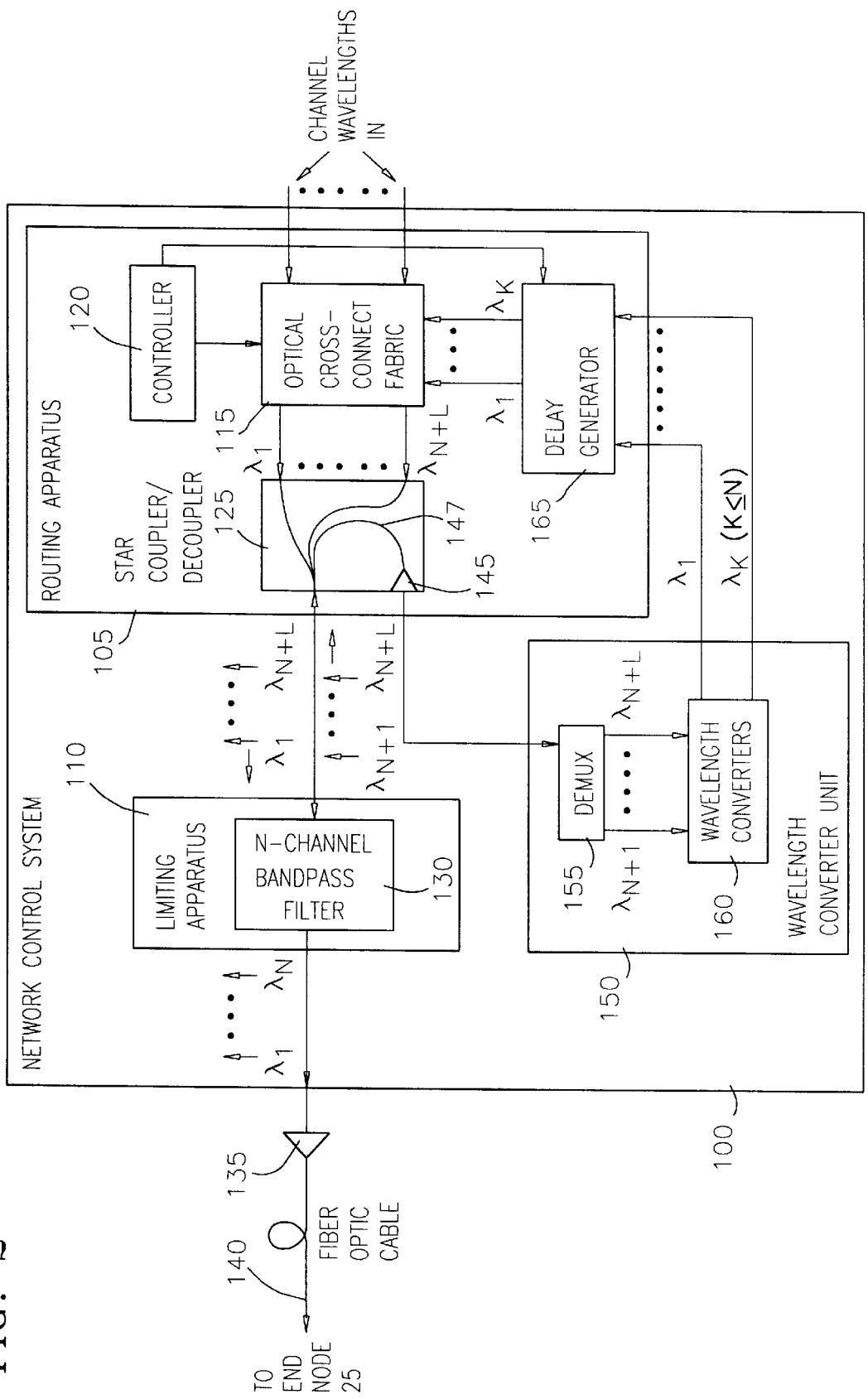
FIG. 2 is a simplified block diagram illustration of another preferred implementation of the network control system of FIG. 1.

Reference is now made to FIG. 2 which is a simplified block diagram illustration of a preferred implementation of a network control system 100 constructed and operative in accordance with a preferred embodiment of the present invention. It is appreciated that the network control system 100 is a preferred implementation of the network control system 10 of FIG. 1 substantially based on passive optical components for limiting the number of channel wavelengths actually used for substantially simultaneously communicating optical signals to the end node 25.

Preferably, the network control system 100 includes routing apparatus 105, and limiting apparatus 110 which is operatively associated with the routing apparatus 105. The routing apparatus 105 preferably includes an optical cross-connect fabric 115 which is operative to receive data in a form of optical signals carried over a plurality of channel wavelengths and to switch and route the optical signals carried over the plurality of channel wavelengths to addressed destinations under control of a controller 120 which may include a conventional micro-processor or a conventional micro-controller.

It is appreciated that the optical cross-connect fabric 115 may include, for example, a cross-connect system having a plurality of optical switches as is well known in the art, for example, from the above mentioned article titled "Optical switching promises cure for telecommunications logjam", by Jeff Hecht in the Laser Focus World magazine dated September 1998. As mentioned in the article by Jeff Hecht, the optical switches may include, for example, thermo-optic switches which may switch output between fibers when heat is turned on. Alternatively, the optical switches may include free-space micro-machined optical switches which use micro-lenses and pop-up mirrors to deflect light. It is appreciated that the operation of the thermo-optic switches as well as the operation of the free-space micro-machined optical switches may be controlled by the controller 120.

Preferably, the optical cross-connect fabric 115 outputs optical signals carried over a plurality of channel wavelengths, such as N+L channel wavelengths indicated by $\lambda_1, \ldots, \lambda_{N+L}$, where N and L are integer numbers. The optical signals carried over the N+L channel wavelengths are preferably fed to a star coupler/decoupler 125 having a plurality of "branches" and being operative to combine the N+L channel wavelengths carrying the optical signals and to provide optical signals multiplexed by WDM of N+L channel wavelengths to the limiting apparatus 110.

At the limiting apparatus 110, the optical signals multiplexed by WDM of N+L channel wavelengths are preferably provided to a bandpass filter 130 which is substantially transparent only to optical signals transmitted within at least one bandwidth. Preferably, the at least one bandwidth is selected so as to include no more than N channel wavelengths, such as the N channel wavelengths $\lambda_1, \ldots, \lambda_N$, so that only optical signals carried over up to N channel wavelengths in total within the at least one bandwidth may be substantially simultaneously transmitted to the end node 25. It is appreciated that the filter 130 does not transmit optical signals carried over channel wavelengths outside the at least one bandwidth.

The filter 130 having the at least one bandwidth may be constructed by combining a long wave pass filter in series with a short wave pass filter as is well known in the art. It is appreciated that suitable combinations of long wave pass filters with short wave pass filters may yield bandpass filters of variable bandwidths from a few nanometers to several thousand nanometers. Additionally, since the 50% transmission point of each long pass filter and each short pass filter may be shifted to a shorter wavelength when tilting each filter from normal, virtually any center wavelength and bandwidth in the infrared spectrum may be selected.

In a case that the at least one bandwidth of the filter 130 includes more than one pass-band, such as two pass-bands, the pass-bands may be separated by a non-transmitting pass-band. In such a case, optical signals transmitted by the filter 130 are preferably carried over two separated groups of channel wavelengths. It is appreciated that the non-transmitting pass-band may reduce interference between the two groups of channel wavelengths. Preferably, each of the two pass-bands may be obtained by combining a suitable long wave pass filter in series with a suitable short wave pass filter as mentioned above.

It is appreciated that in WDM based systems, filters are typically combined with a star decoupler to form a WDM demultiplexer which separates incoming wavelength division multiplexed optical signals. Each filter in such a WDM demultiplexer is typically operative to transmit optical signals carried over one channel wavelength only thereby providing separation of the one channel wavelength from other channel wavelengths. However, as mentioned above, the filter 130 preferably encompasses a group of channel wavelengths, and the pass-band of filter 130 is therefore broader than a pass-band of a filter used in a WDM demultiplexer. It is appreciated that the pass-band of the filter 130 may be tunable and controlled by the controller 120, for example, via one of the N channel wavelengths, thereby enabling selection of the number of channel wavelengths transmitted by the filter 130. It is further appreciated that the pass-band of the filter 130 may be either a transmission pass-band or a reflection pass-band.

The optical signals carried over the N multiplexed channel wavelengths transmitted by the filter 130 are preferably amplified by a conventional optical amplifier 135, such as an EDFA for wavelengths around 1550 nm, and transmitted to the end node 25 over a fiber optic cable 140.

In a preferred embodiment of the present invention, the optical signals carried over channel wavelengths outside the at least one bandwidth, i.e., optical signals carried over L channel wavelengths indicated by $\lambda_{N+1}, \ldots, \lambda_{N+L}$, may be reflected at an angle of 180° towards the star coupler/decoupler 125 following the same route of the optical signals provided by the star coupler/decoupler 125 to the limiting apparatus 110, or following a different route, such as via a separate fiber optic cable (not shown) which may be coupled to the star coupler/decoupler 125. It is appreciated that reflection of the optical signals carried over the L channel wavelengths may be achieved by providing a pass-band reflective coating on the filter 130 which reflects optical signals carried over channel wavelengths outside the at least one bandwidth.

Preferably, optical signals reflected towards the star coupler/decoupler 125 may be distributed equally among all the branches of the star coupler/decoupler 125. The star coupler/decoupler 125 preferably includes a port 145 at an end of a branch 147 which is coupled to a wavelength converter unit 150. Since the optical signals are distributed equally among all the branches of the star coupler/decoupler 125, the port 145 receives all the optical signals carried over the L channel wavelengths $\lambda_{N+1}, \ldots, \lambda_{N+L}$, and provides the optical signals carried over the L channel wavelengths to a demultiplexer 155 within the wavelength converter unit 150.

Preferably, the demultiplexer 155 separates the L channel wavelengths and provides the optical signals carried over the L separated channel wavelengths to a series of wavelength converters 160 which are operative to change the L channel wavelengths of the optical signals carried over the L channel wavelengths to at least one of the N channel wavelengths transmitted by the filter 130 thereby to form converted optical signals. For example, the at least one of the N channel wavelengths transmitted by the filter 130 may include the K channel wavelengths indicated by $\lambda_1, \ldots, \lambda_K$, where K is an integer number less than or equal to N.

The converted optical signals carried over the channel wavelengths $\lambda_1, \ldots, \lambda_K$ may be transmitted to a remote routing apparatus (not shown) in a remote NST (not shown). The remote routing apparatus may be similar to the routing apparatus 105 and may separately transmit the converted optical signals to the end node 25, such as via a separate link and a separate route (not shown). Alternatively, the remote routing apparatus may transmit the converted optical signals back to the routing apparatus 105 for transmission at a convenient opportunity as described herein below.

Further alternatively, the converted optical signals may be provided to a delay generator 165 which is preferably operatively associated with the routing apparatus 105, and is operative to delay the converted optical signals by a suitable delay time period determined by the controller 120. The structure and functionality of the delay generator 165 is described herein below with reference to FIGS. 8A and 8B.

Preferably, the delay generator 165 feeds the converted optical signals, after the suitable delay time period, to the optical cross-connect fabric 115 which routes the converted optical signals to the star coupler/decoupler 125. The star coupler/decoupler 125 preferably combines the converted optical signals and provides converted optical signals multiplexed by WDM of K channel wavelengths to the limiting apparatus 110.

At the limiting apparatus 110, the converted optical signals multiplexed by WDM of K channel wavelengths are preferably provided to the bandpass filter 130. Since the filter 130 is substantially transparent to optical signals carried over the K channel wavelengths, the converted optical signals multiplexed by WDM of K channel wavelengths may be substantially simultaneously transmitted to the end node 25 via the fiber optic cable 140, typically, after amplification by the optical amplifier 135.

As mentioned above, the filter 130 rejects optical signals originally carried over the L channel wavelengths outside the at least one bandwidth, and transmits optical signals originally carried over the N channel wavelengths within the at least one bandwidth. However, by using the wavelength converter unit 150, the optical signals originally carried over the L channel wavelengths may still be transmitted as converted optical signals which are carried over the at least one of the N channel wavelengths. Preferably, the controller 120 may be operative to apply a queued transmission of optical signals in which the converted optical signals are transmitted over the at least one of the N channel wavelengths from the network control system 100 to the end node 25 after the original optical signals carried over the N channel wavelengths are transmitted to the end node 25.

Alternatively, the controller 120 may be operative to implement transmission of optical signals in a combined form in which the converted optical signals are combined with the optical signals originally carried over the N channel wavelengths within the at least one bandwidth to form combined optical signals. Then, the combined optical signals are substantially simultaneously transmitted over the N channel wavelengths from the network control system 100 to the end node 25.

The operation of the apparatus of FIG. 2 is now briefly described. Preferably, optical signals carried over a plurality of channel wavelengths are fed to the optical cross-connect fabric 115 and routed to the star coupler/decoupler 125. The star coupler/decoupler 125 combines the optical signals carried over the plurality of channel wavelengths to form optical signals multiplexed by WDM of a plurality of channel wavelengths which are fed to the filter 130 in the limiting apparatus 110.

Preferably, the filter 130 is adjusted to allow transmission of optical signals over a group of N channel wavelengths only, wherein N is a highest number of separable channel wavelengths at the end node 25. If the filter 130 is tunable, adjustment of the filter 130 may include tuning of a bandpass of the filter 130 to include up to N channel wavelengths. If the filter 130 is not tunable, several fixed-band filters may be combined to determine a suitable pass-band of the filter 130 which includes up to N channel wavelengths.

Preferably, if the plurality of channel wavelengths over which the optical signals supplied by the star coupler/decoupler 125 are carried are within the group of N channel wavelengths, the optical signals multiplexed by WDM of the plurality of channel wavelengths are transmitted to the end node 25 over the fiber optic cable 140.

If, however, some of the optical signals are carried over channel wavelengths not within the group of N channel wavelengths, the optical signals carried over the channel wavelengths which are not within the group of N channel wavelengths are not transmitted to the end node 25 over the fiber optic cable 140.

It is appreciated that the optical signals carried over channel wavelengths not within the group of N channel wavelengths may be alternatively transmitted to a remote NST (not shown) which may have a filter (not shown) transparent to the optical signals carried over the channel wavelengths not within the group of N channel wavelengths. It is appreciated that the filter in the remote NST may be operative to transmit the optical signals carried over channel wavelengths not within the group of N channel wavelengths to the end node 25 via a separate link (not shown) and a separate route (not shown).

Preferably, in a case that the network control system 100 includes the wavelength converter unit 150, channel wavelengths of the optical signals carried over the channel wavelengths which are not within the group of N channel wavelengths may be converted to channel wavelengths within the group of N channel wavelengths thereby forming converted optical signals. The converted optical signals may be fed back to the optical cross-connect fabric 115 via the delay generator 165 which is operative to delay the converted optical signals by a suitable delay time period determined by the controller 120.

It is appreciated that the controller 120 may determine the suitable delay time period according to a determination that transmission over the fiber optic cable 140 may currently be performed. For example, in data download applications, there may be a time difference between a request to download a first file and a request to download a second file. In such a case, data flow over a channel wavelength carrying the first file and the second file may have discontinuities in the form of idle periods during which data is not carried over the channel wavelength, or periods in which a data rate of data carried over the channel wavelength decreases. Thus, the controller 120 may determine the suitable delay time period as a time period elapsing until beginning of an idle period or beginning of a period in which a data rate of data carried over at least one channel wavelength decreases. It is appreciated that the suitable delay time period may also include a zero time delay. Preferably, determination that transmission over the fiber optic cable 140 may be performed is made at the beginning of the idle period or at the beginning of the period in which a data rate of data carried over at least one channel wavelength decreases.

In a case that the controller 120 determines that transmission over the fiber optic cable 140 may be performed at the beginning of the period in which a data rate of data carried over at least one channel wavelength decreases, the converted optical signals may be combined with non-converted optical signals carried over the at least one channel wavelength, and possibly with non-converted optical signals carried over other channel wavelengths in the group of N channel wavelengths to form combined optical signals.

It is appreciated that the combined optical signals may be produced only if a resultant data rate on each corresponding channel wavelength does not exceed a channel data rate threshold. The channel data rate threshold may be determined, for example, by a maximum channel capacity, or by characteristics of optoelectronic components (not shown) at the end node 25 or at the NST 15, such characteristics including, for example, a maximum attainable modulation frequency of optical transmitters (not shown) at one of the NST 15 and the end node 25.

Alternatively, in a case that the controller 120 determines that transmission over the fiber optic cable 140 may be performed at the beginning of the idle period, the converted optical signals delayed by the suitable delay time period may be fed, via the star coupler/decoupler 125, to the filter 130. It is appreciated that since the converted optical signals are currently carried over channel wavelengths within the group of N channel wavelengths, the filter 130 may transmit the converted optical signals via the fiber optic cable 140 to the end node 25. Thus, the converted optical signals are transmitted after the original optical signals carried over the N channel wavelengths are transmitted to the end node 25.

If the suitable delay time period is long, such as of the order of a few seconds or more, the optical cross-connect fabric 115 preferably transmits the converted optical signals to the remote NST which may transmit the converted optical signals to the end node 25 via the separate link and the separate route. Alternatively or additionally, the controller 120 may send a message to providers of the data carried over the channel wavelengths which are not within the selected group of N channel wavelengths (not shown) instructing them to stop transmitting data to the network control system 100.

It is appreciated that if communication between the network control system 100 and the end node 25 involves polarized optical signals, polarization separating equipment at the end node 25 or at a service area of the end node 25 may provide additional channel wavelength separation which is preferably accounted for in a determination of the highest number N of separable channel wavelengths at the end node 25.

Figure 3:
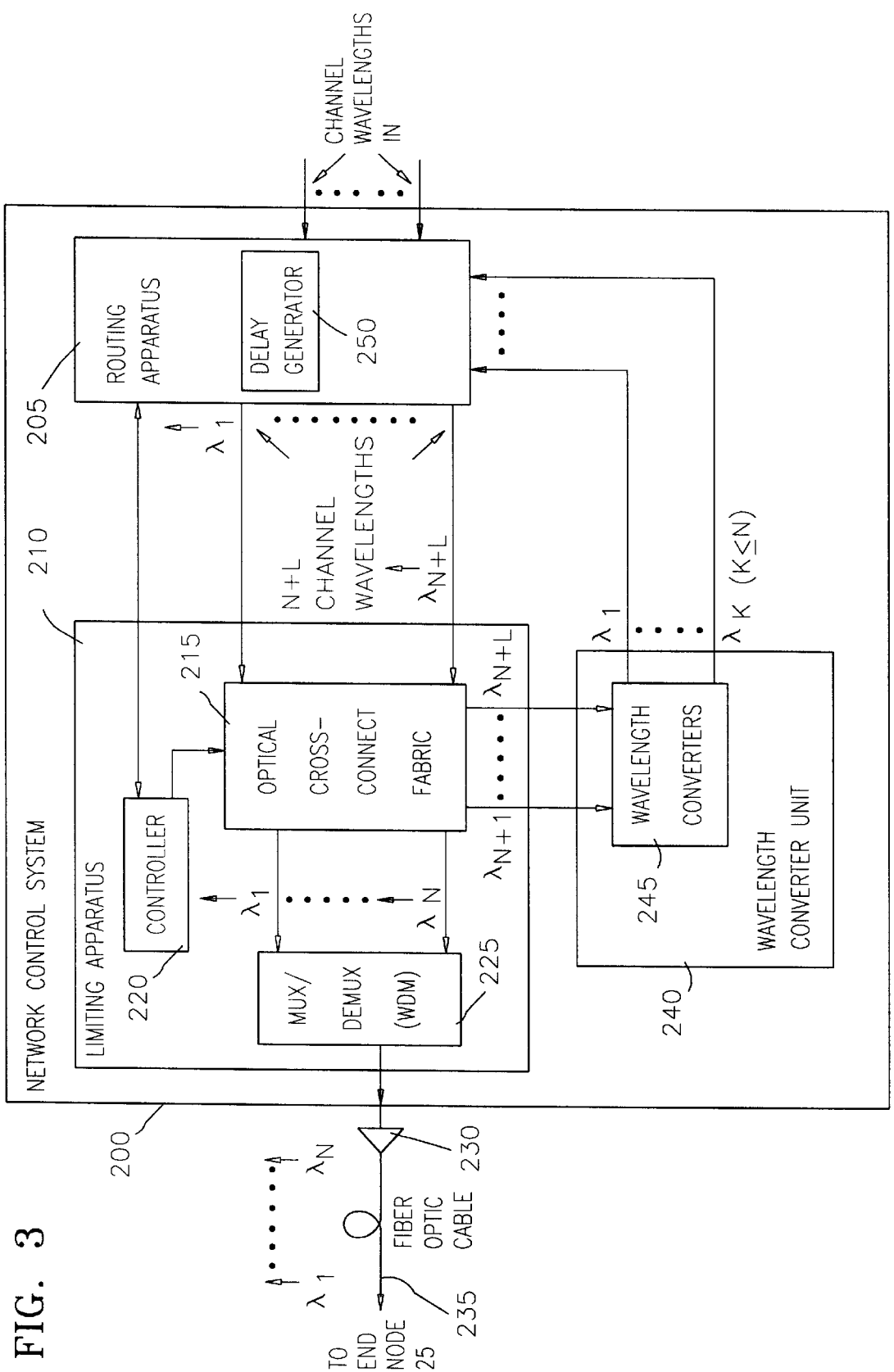
FIG. 3 is a simplified block diagram illustration of yet another preferred implementation of the network control system of FIG. 1.

Reference is now made to FIG. 3 which is a simplified block diagram illustration of a preferred implementation of a network control system 200 constructed and operative in accordance with a preferred embodiment of the present invention. It is appreciated that the network control system 200 is another preferred implementation of the network control system 10 of FIG. 1 substantially based on active elements for limiting the number of channel wavelengths actually used for substantially simultaneously communicating optical signals to the end node 25.

Preferably, the network control system 200 includes routing apparatus 205, and limiting apparatus 210 which is operatively associated with the routing apparatus 205. The routing apparatus 205 is preferably operative to receive a plurality of channel wavelengths and to switch and route the plurality of channel wavelengths to addressed destinations, one of the destinations being the end node 25. It is appreciated that the routing apparatus 205 may include conventional switching and routing equipment which make the routing apparatus 205 capable of communicating optical signals over a plurality of channel wavelengths.

In a case that the output of the routing apparatus 205 which is addressed to the end node 25 includes optical signals carried over N+L channel wavelengths indicated by $\lambda_1, \ldots, \lambda_{N+L}$, where N and L are integer numbers, the optical signals carried over the N+L channel wavelengths are preferably provided to an optical cross-connect fabric 215 in the limiting apparatus 210. It is appreciated that the optical cross-connect fabric 215 may be similar in structure and functionality to the optical cross-connect fabric 115 of FIG. 2.

The optical cross-connect fabric 215 is preferably controlled by a controller 220, and is operatively associated with a MUX/DEMUX 225, which may be a conventional wavelength division multiplexer/demultiplexer. It is appreciated that the controller 220 and the MUX/DEMUX 225 may be embodied in the limiting apparatus 210.

The controller 220 preferably includes a conventional micro-processor or a conventional micro-controller. Preferably, upon installation of channel wavelength separating equipment at the end node 25, a highest number N of separable channel wavelengths at the end node 25 may be determined and provided to the controller 220. If the number N of separable channel wavelengths at the end node 25 is determined at the end node 25, control information including a determination of the number N may be transmitted from the end node 25 to the network control system 200, for example, over a dedicated control channel (not shown).

Once the highest number N of separable channel wavelengths at the end node 25 is determined, the controller 220 preferably selects N channel wavelengths which may be used for communication with the end node 25 from the N+L channel wavelengths, such as the channel wavelengths indicated by $\lambda_1, \ldots, \lambda_N$. It is appreciated that the N channel wavelengths may be selected by the controller 220 so as to provide good communication performance over the N channel wavelengths, for example, by applying techniques for selecting and rearranging channel wavelengths which improve communication performance of an optical communication network as recited in the above mentioned copending U.S. patent application Ser. No. 09/126,378 filed on Jul. 30, 1998. Alternatively, the N channel wavelengths may be arbitrarily selected or selected according to predetermined criteria, such as a preferred transmission bandwidth.

Preferably, after selecting the N channel wavelengths, the controller 220 configures the optical cross-connect fabric 215 in a mode which enables routing of the N channel wavelengths to the MUX/DEMUX 225, and prevents routing of channel wavelengths other than the N channel wavelengths to the MUX/DEMUX 225.

Preferably, optical signals carried over the N channel wavelengths are multiplexed at the MUX/DEMUX 225 and amplified by a conventional optical amplifier 230, such as an EDFA for wavelengths around 1550 nm. After amplification, the optical signals carried over the N multiplexed channel wavelengths are preferably transmitted to the end node 25 over a fiber optic cable 235. It is appreciated that optical signals carried over channel wavelengths other than the N channel wavelengths are not transmitted to the end node 25. Thus, a limitation of the number of channel wavelengths actually used for substantially simultaneously communicating optical signals to the end node 25 is achieved by the controller 220 configuring the optical cross-connect fabric 215 to route optical signals over N channel wavelengths selected by the controller 220.

It is appreciated that since the limitation of the number of channels actually used for substantially simultaneously communicating optical signals to the end node 25 is provided by the controller 220, the optical cross-connect fabric 215 may have more than N output ports, and the MUX/DEMUX 225 may have more than N input ports.

Alternatively, the limitation of the number of channels actually used for substantially simultaneously communicating optical signals to the end node 25 may be achieved by implementing the optical cross-connect fabric 215 by an optical cross-connect fabric having exactly N output ports, i.e., an N-channel router, and the MUX/DEMUX 225 by a MUX/DEMUX having exactly N input ports. In such a case, the controller 220 may be used only for selection of a preferred set of N channel wavelengths.

In a preferred embodiment of the present invention, channel wavelengths which are not used for communication with the end node 25, i.e., L channel wavelengths indicated by $\lambda_{N+1}, \ldots, \lambda_{N+L}$, may be routed by the optical cross-connect fabric 215 to a wavelength converter unit 240 which may include a series of wavelength converters 245, similar in structure and functionality to the wavelength converters 160 of FIG. 2. The series of wavelength converters 245 are preferably operative to change the L channel wavelengths of the optical signals carried over the L channel wavelengths to at least one of the N channel wavelengths selected by the controller 220 thereby to form converted optical signals. For example, the at least one of the N channel wavelengths selected by the controller 220 may include the K channel wavelengths indicated by $\lambda_1, \ldots, \lambda_K$, where K is an integer number less than or equal to N.

Preferably, the converted optical signals may be treated in a similar manner to that mentioned above for the converted optical signals in the apparatus of FIG. 2. Thus, the converted optical signals carried over the channel wavelengths $\lambda_1, \ldots, \lambda_K$ may be provided to the routing apparatus 205 which may perform at least one of the following operations: (a) inject the converted optical signals back to the limiting apparatus 210 for transmission via the fiber optic cable 235, preferably, after a suitable delay time period generated by a delay generator 250 which is similar to the delay generator 165 of FIG. 2, and by using the queued transmission method as mentioned above with reference to FIG. 2; (b) implement the transmission method in which the converted optical signals are transmitted in combination with the optical signals originally carried over the N channel wavelengths as mentioned above with reference to FIG. 2; (c) transmit the converted optical signals to a remote NST (not shown) which may separately transmit the converted optical signals to the end node 25, such as via a separate link and a separate route (not shown); and (d) send a message to providers of data carried over the L channel wavelengths indicated by $\lambda_{N+1}, \ldots, \lambda_{N+L}$ (not shown) instructing them to stop transmitting data to the network control system 200.

It is appreciated that the optical signals carried over the L channel wavelengths may be transmitted to the remote NST directly without conversion in the wavelength converter unit 240 if the remote NST is capable of transmitting the optical signals carried over the L channel wavelengths.

The operation of the apparatus of FIG. 3 is now briefly described. Preferably, optical signals carried over a plurality of channel wavelengths are fed to the routing apparatus 205 which routes at least some of the optical signals carried over at least some of the plurality of channel wavelengths to the limiting apparatus 210.

Preferably, at the limiting apparatus 210, the controller 220 is adjusted to allow transmission of optical signals over a group of N channel wavelengths only, wherein N is a highest number of separable channel wavelengths at the end node 25. If the optical signals are carried over channel wavelengths within the group of N channel wavelengths, the optical signals are routed to the MUX/DEMUX 225 which multiplexes the optical signals by WDM and transmits the signals in a wavelength division multiplexed form to the end node 25 over the fiber optic cable 235.

If, however, some of the optical signals are carried over channel wavelengths not within the group of N channel wavelengths, the optical signals carried over the channel wavelengths which are not within the group of N channel wavelengths are not transmitted to the end node 25 over the fiber optic cable 235.

Preferably, in a case that the network control system 200 includes the wavelength converter unit 240, the optical signals carried over the channel wavelengths which are not within the group of N channel wavelengths are routed to the wavelength converter unit 240 which converts the channel wavelengths of the optical signals carried over the channel wavelengths which are not within the group of N channel wavelengths to channel wavelengths within the group of N channel wavelengths thereby forming converted optical signals. The converted optical signals are preferably treated in a similar manner to that mentioned above for the converted optical signals in the apparatus of FIG. 2.

It is appreciated that if communication between the network control system 200 and the end node 25 involves polarized optical signals, polarization separating equipment at the end node 25 or at a service area of the end node 25 may provide additional channel wavelength separation which is preferably accounted for in a determination of the highest number N of separable channel wavelengths at the end node 25.

Preferably, each of the limiting apparatuses 40 of FIG. 1, 110 of FIG. 2, and 210 of FIG. 3 may be also employed as a junction unit in any suitable optical communication network, so that a group of channel wavelengths may be together routed to a destination, such as another junction unit, rather than a single channel wavelength.

Alternatively or additionally, each of the limiting apparatuses 40 of FIG. 1, 110 of FIG. 2, and 210 of FIG. 3 may be employed as an add/drop multiplexer (ADM) which separates a sub-group of channel wavelengths from a group of channel wavelengths in order to add/drop the sub-group of channel wavelengths as necessary. It is appreciated that such an ADM may be employed in a conventional central office of any suitable optical communication network. It is further appreciated that in a case that the sub-group of channel wavelengths includes only one channel wavelength, the functionality of the above mentioned ADM is similar to that of conventional add/drop multiplexers.

It is appreciated that since one of the parameters which determine communication performance of a WDM based optical communication network is the density of channel wavelengths multiplexed by WDM, limitation of a number of channel wavelengths actually used for communicating optical signals to an end node of the WDM based optical network as mentioned above with reference to FIGS. 1–3 may improve performance of the WDM based optical communication network.

Figure 4:
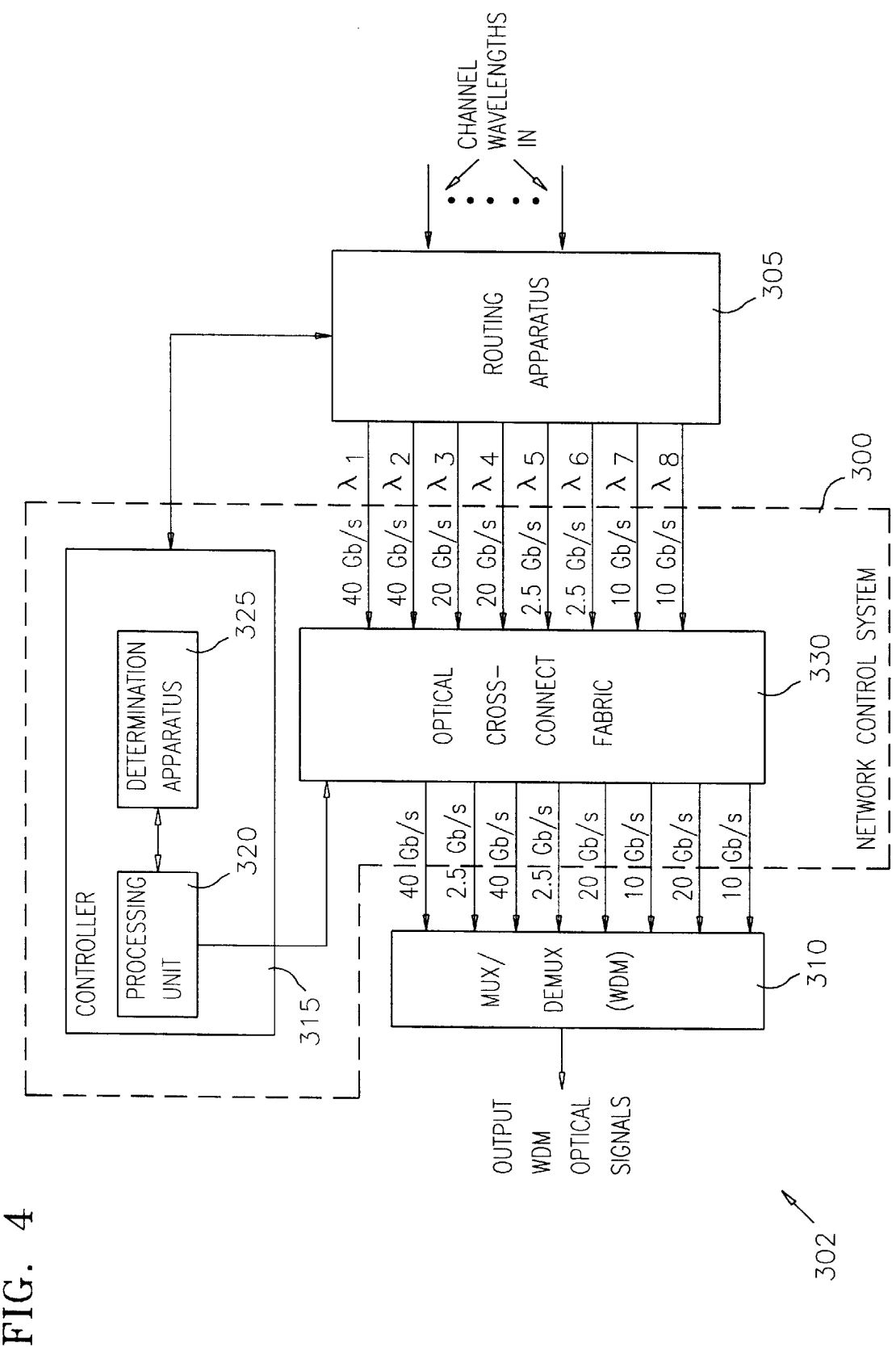
FIG. 4 is a simplified block diagram illustration of a preferred implementation of a network control system which may be implemented either at a node serving terminal or at an end node of a communication network which utilizes wavelength division multiplexing, the network control system being constructed and operative in accordance with a preferred embodiment of the present invention.

Reference is now made to FIG. 4 which is a simplified block diagram illustration of a preferred implementation of a network control system 300 constructed and operative in accordance with a preferred embodiment of the present invention. It is appreciated that the network control system 300 may be implemented either at a node serving terminal (not shown) or at an end node (not shown) of a communication network 302 which utilizes WDM.

Preferably, the network control system 300 is operatively associated with routing apparatus 305 and a MUX/DEMUX 310 which may be a conventional wavelength division multiplexer/demultiplexer. The routing apparatus 305 is preferably similar in structure and functionality to the routing apparatus 205 of FIG. 3, and is preferably operative to receive data over a plurality of channel wavelengths and to switch and route data carried over N channel wavelengths at various data rates to the network control system 300, where N is an integer number. The N channel wavelengths are preferably spaced apart a channel spacing S from each other.

It is appreciated that FIG. 4 and the description provided herein below with reference to FIG. 4 refer to an example in which N=8, with the eight channel wavelengths being indicated by $\lambda_1, \lambda_2, \lambda_3, \lambda_4, \lambda_5, \lambda_6, \lambda_7$ and $\lambda_8$. However, it is appreciated that any number of channel wavelengths may be routed to the network control system 300 from the routing apparatus 305 without limiting the invention. The channel wavelengths $\lambda_1, \ldots, \lambda_8$ are substantially spaced apart a channel spacing S from each other so that $\lambda_2-\lambda_1=S$, $\lambda_3-\lambda_2=S$, $\lambda_4-\lambda_3=S$, $\lambda_5-\lambda_4=S$, $\lambda_6-\lambda_5=S$, $\lambda_7-\lambda_6=S$ and $\lambda_8-\lambda_7=S$. The channel spacing S may be, for example, 0.4 nm, but it is appreciated that the invention is not limited by the size of the channel spacing S.

Preferably, the network control system 300 includes a controller 315 which may include a processing unit 320 and determination apparatus 325. It is appreciated that the determination apparatus 325 may be a separate unit or comprised in the processing unit 320, and the processing unit 320 may include a conventional micro-processor or a conventional micro-controller.

The controller 315 is preferably operatively associated with the routing apparatus 305, for example, via the determination apparatus 325, and with an optical cross-connect fabric 330 which may be comprised in the network control system 300. It is appreciated that the optical cross-connect fabric 330 may be similar in structure and functionality to the optical cross-connect fabric 115 of FIG. 2 and the optical cross-connect fabric 215 of FIG. 3.

Preferably, the optical cross-connect fabric 330 is operatively associated with the MUX/DEMUX 310 and is operative, under control of the controller 315, to modify, as necessary, an arrangement of the data carried over the eight channel wavelengths multiplexed by WDM in order to reduce interference and improve performance of the communication network 302. The MUX/DEMUX 310 is preferably operative to output the data provided by the optical cross-connect fabric 330 as wavelength division multiplexed optical signals for communication via the communication network 302.

The operation of the apparatus of FIG. 4 is now briefly described. Preferably, the determination apparatus 325 determines a first distribution of the N channel wavelengths provided by the routing apparatus 305 in which K out of the N channel wavelengths are each characterized by the following characteristics: (a) each of the K channel wavelengths carries data at a data rate which is higher than a threshold; and (b) each of the K channel wavelengths is spaced apart the channel spacing S from at least one of the K channel wavelengths which is a nearest neighbor.

In the example shown in FIG. 4, the threshold is selected to be 10 Gigabits/second (Gb/s), and 4 channel wavelengths carry data at data rates which are higher than the threshold, i.e., K=4. Additionally, the four channel wavelengths which carry the data at data rates which are higher than the threshold are the channel wavelengths indicated by $\lambda_1, \lambda_2, \lambda_3, \lambda_4$ which are spaced apart the channel spacing S from each other.

Preferably, the processing unit 320 produces a second distribution of the N channel wavelengths in which the number of channel wavelengths having the above mentioned characteristics is less than 4. In the example shown in FIG. 4, the second distribution provides a separation of twice the channel spacing S between channel wavelengths which carry data at data rates which are higher than 10 Gb/s thereby reducing interference between the channel wavelengths which carry data at data rates which are higher than 10 Gb/s.

Once the second distribution is produced, the optical cross-connect fabric 330 reroutes the data from the 8 channel wavelengths of the first distribution to the 8 channel wavelengths of the second distribution under control of the processing unit 315. The data carried over the 8 channel wavelengths of the second distribution is then provided to the MUX/DEMUX 310 which is preferably operative to output the data in a wavelength division multiplexed form for communication via the communication network 302.

Figure 5:
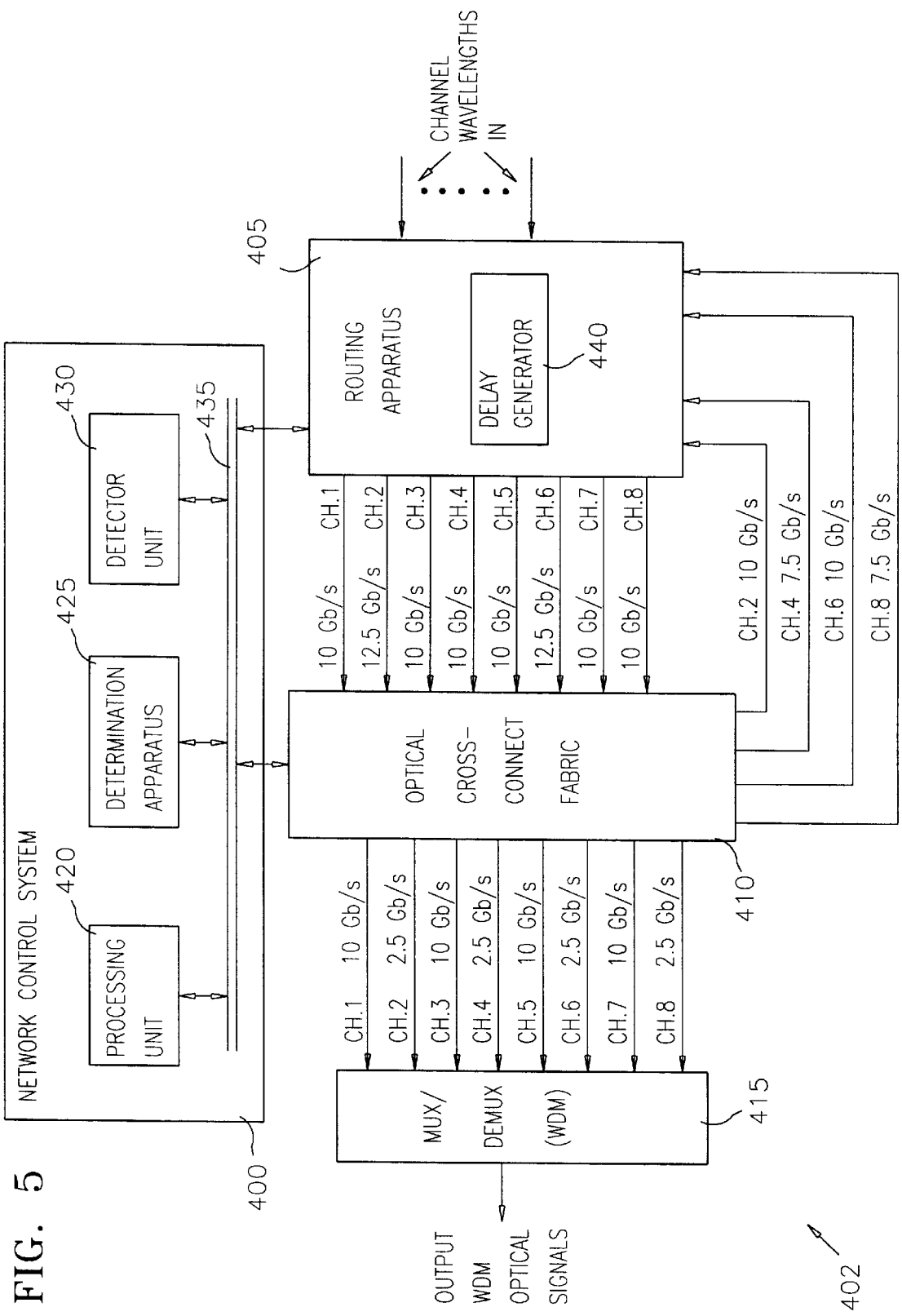
FIG. 5 is a simplified block diagram illustration of another preferred implementation of a network control system which may be implemented either at a node serving terminal or at an end node of a communication network which utilizes wavelength division multiplexing, the network control system being constructed and operative in accordance with a preferred embodiment of the present invention.

Reference is now made to FIG. 5 which is a simplified block diagram illustration of another preferred implementation of a network control system 400 constructed and operative in accordance with a preferred embodiment of the present invention. It is appreciated that the network control system 400 may be implemented either at a node serving terminal (not shown) or at an end node (not shown) of a communication network 402 which utilizes WDM.

Preferably, the network control system 400 is operatively associated with routing apparatus 405 and an optical cross-connect fabric 410. The routing apparatus 405 is preferably similar in structure and functionality to the routing apparatus 205 of FIG. 3. Preferably, the routing apparatus 405 is operative to receive data over a plurality of channel wavelengths and to switch and route N channel wavelengths carrying data at various data rates to the optical cross-connect fabric 410, wherein N is an integer number.

The optical cross-connect fabric 410 is preferably similar in structure and functionality to the optical cross-connect fabric 215. Preferably, the optical cross-connect fabric 410 is operatively associated with a MUX/DENUX 415 and is operative to provide the data carried over the N channel wavelengths to the MUX/DEMUX 415. It is appreciated that the MUX/DEMUX 415 may be a conventional wavelength division multiplexer/demultiplexer which is preferably operative to multiplex the data carried over the N channel wavelengths and to output the data as wavelength division multiplexed optical signals to a destination (not shown).

The network control system 400 preferably includes a processing unit 420, determination apparatus 425 and a detector unit 430 which may be each operatively associated with the routing apparatus 405 and the optical cross-connect fabric 410 via a communication bus 435. It is appreciated that the processing unit 420, the determination apparatus 425, the detector unit 430, and the communication bus 435 may be comprised in a conventional micro-processor or a conventional micro-controller.

Preferably, the routing apparatus 405 may be operatively associated with a delay generator 440 which may be similar to the delay generators 165 of FIG. 2, and 250 of FIG. 3. The structure and functionality of the delay generator 440 is described herein below with reference to FIGS. 8A and 8B.

It is appreciated that the network control system 400 is operative to control and/or modify, as necessary, data rates of data carried over the N channel wavelengths which are multiplexed by WDM in order to reduce interference and improve performance of the communication network 402.

The operation of the apparatus of FIG. 5 is now briefly described with reference to a case in which interference between at least two of the N channel wavelengths is detected by the detector unit 430. It is appreciated that the detector unit 430 may detect the interference between the at least two of the N channel wavelengths, for example, by receiving an indication of the interference from conventional BER measurement equipment (not shown) in the routing apparatus 405.

Preferably, once interference between the at least two of the N channel wavelengths is detected, the determination apparatus 425 determines a sequence of the N channel wavelengths, either in an increasing or a decreasing order, and assigns an even channel number or an odd channel number to each of the N channel wavelengths. Throughout the specification and claims the term "even channel wavelength" is used for a channel wavelength having an even channel number, and the term "odd channel wavelength" is used for a channel wavelength having an odd channel number.

Preferably, the determination of the sequence of the N channel wavelengths is provided to the processing unit 420. The processing unit 420 is preferably operative to cause a reduction of one of the following: (a) a data rate of data carried over at least one odd channel wavelength in the sequence of the N channel wavelengths with respect to a data rate of data carried over even channel wavelengths which are nearest neighbors to the at least one odd channel wavelength in the sequence of the N channel wavelengths, and (b) a data rate of data carried over at least one even channel wavelength in the sequence of the N channel wavelengths with respect to a data rate of data carried over odd channel wavelengths which are nearest neighbors to the at least one even channel wavelength in the sequence of the N channel wavelengths. Thus, channel wavelengths carrying data at data rates which are not reduced, i.e., even channel wavelengths or odd channel wavelengths respectively, are less interfered.

It is appreciated that in a case that interference between at least two of the N channel wavelengths is not detected, the data rate is not reduced on any of the N channel wavelengths.

FIG. 5 and the description provided herein below with reference to FIG. 5 refer to an example in which N=8, with the eight channel wavelengths being arranged in a sequence in which the 8 channel wavelengths are indicated by CH. 1, ..., CH. 8. However, it is appreciated that the invention is not limited by the number of channel wavelengths used.

As shown in FIG. 5, each of the two channel wavelengths indicated by CH. 2 and CH. 6 carries data at a 12.5 Gb/s data rate, whereas each of the other 6 channel wavelengths, i.e., each of the channel wavelengths indicated by CH. 1, CH. 3, CH. 4, CH. 5, CH. 7, and CH. 8, carries data at a 10 Gb/s data rate.

As mentioned above, when interference is detected by the detector unit 430, the network control system 400 causes a reduction of a data rate of data carried over all even channel wavelengths in the sequence of the 8 channel wavelengths with respect to a data rate of data carried over odd channel wavelengths which are nearest neighbors to the even channel wavelengths. In the example depicted in FIG. 5, the data rate on each even channel wavelength is reduced, according to a first preferred data rate reduction scheme, to a fixed data rate of 2.5 Gb/s without reference to the data rate carried on each even channel wavelength before a reduction of the data rate. However, it is appreciated that other data rate reduction schemes may be implemented as described herein below.

In a second preferred data rate reduction scheme (not shown in FIG. 5), data rate of data carried on each even channel wavelength may be reduced gradually until interference between the at least two of the N channel wavelengths falls below an acceptable interference level. In such a case, after a data rate reduction, some or all of the even channel wavelengths may carry data at different data rates. It is appreciated that the acceptable interference level may be predetermined or calculated, preferably by the processing unit 420, substantially in real time.

In a third preferred data rate reduction scheme (not shown in FIG. 5), data rates of data carried over even channel wavelengths which experience interference may be reduced to lower values than data rates of data carried over even channel wavelengths which do not experience interference. For example, if CH. 2 and CH. 4 in the apparatus of FIG. 5 experience interference, the data rates of data carried over CH. 2 and CH. 4 may be reduced, for example, to 2.5 Gb/s, and the data rates of data carried over CH. 6, CH. 8 and CH. 10 may be reduced, for example, only to 5 Gb/s.

It is appreciated that in a case that the network control system 400 determines that a cause of the interference no longer exists, the network control system 400 may allow transmission at full data rates over the even channel wavelengths.

Preferably, a reduction of a data rate according to any of the above mentioned data rate reduction schemes may be obtained in a few ways. For example, the network control system 400 may send a message to at least some providers of the data carried over the even channel wavelengths (not shown) instructing them to reduce a data rate of the data transmitted over the respective even channel wavelengths as recited in the above mentioned copending U.S. patent application Ser. No. 09/126,378 filed on Jul. 30, 1998.

A data provider may use various methods to reduce the data rate of the data transmitted over an even channel wavelength. For example, since typically a data source (not shown) of the data provider generates electronic signals which are later converted to optical signals to be carried over one of the even channel wavelengths, the data provider may program the data source so that the rate of generation of the electronic signals at the data source is decreased in response to the message transmitted by the network control system 400. The rate of generation of the electronic signals may be decreased, for example, by multiplexing less electronic channels or by decreasing a rate of generation of electronic data signals at each electronic channel as is well known in the art.

Alternatively, a reduction of a data rate may be achieved by employing the optical cross-connect fabric 410. Since switching speed of typical optical cross-connect fabrics is of the order of a few milliseconds, the network control system 400 may configure the optical cross-connect fabric 410 so that an even channel wavelength is not always opened to receive data. For example, the network control system 400 may configure the optical cross-connect fabric 410 so that CH. 8 may receive data only for a period of 0.25 of a communication time period thereby reducing the data rate on CH. 8 from 10 Gb/s to 2.5 Gb/s. It is appreciated that the period of 0.25 of a communication time period need not necessarily be continuous.

Preferably, rejected data, i.e., data not routed to the MUX/DEMUX 415 due to the reduction of the data rates of the data carried over the even channel wavelengths, may be routed by the optical cross-connect fabric 410 back to the routing apparatus 405. Thus, rejected data carried over CH. 2, CH. 4, CH. 6, and CH. 8 at respective data rates of 10 Gb/s, 7.5 Gb/s, 10 Gb/s, and 7.5 Gb/s is preferably routed back to the routing apparatus 405 and treated in a similar manner to that mentioned above for the converted optical signals in the apparatuses of FIGS. 2 and 3. It is however appreciated that the transmission method mentioned above with reference to FIGS. 2 and 3 in which converted optical signals are transmitted in combination with non-converted optical signals may be respectively implemented in the present case for the rejected data and the reduced rate data carried over the even channel wavelengths only after the cause of interference is removed.

The apparatus of FIG. 5 thus enables communication via the communication network 402 to be continued even under interference conditions. Preferably, transmission over the odd channel wavelengths continues unchanged, whereas communication over the even channel wavelengths is slowed down but not interrupted.

Figure 6:
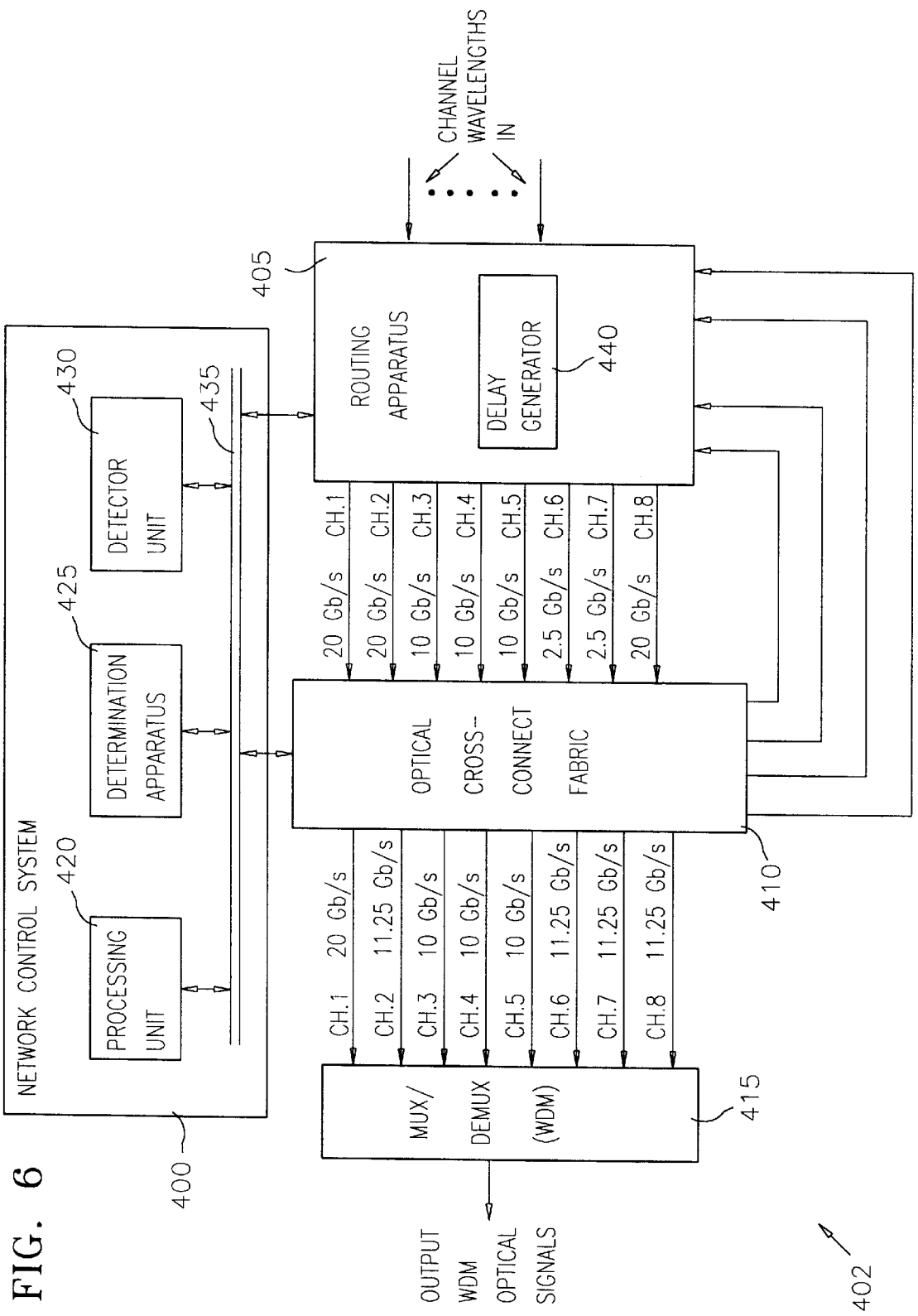
FIG. 6 is a simplified block diagram illustration of another preferred implementation of the network control system of FIG. 5.

Reference is now made to FIG. 6 which is a simplified block diagram illustration of another preferred implementation of the network control system 400 of FIG. 5.

Preferably, in the implementation shown in FIG. 6, once the determination apparatus 425 determines data rates carried over each of the N channel wavelengths, the processing unit 420 may equalize data rates carried over channel wavelengths in at least a sub-group of the N channel wavelengths with respect to each other in the sub-group up to a data rate difference level within a predetermined equalization range.

It is appreciated that an equalization of the data rates carried over the at least a sub-group of the N channel wavelengths may be performed by transferring data from at least a first channel wavelength in the sub-group which carries data at a first data rate to at least a second channel wavelength in the sub-group which carries data at a second data rate being lower than the first data rate until a difference between a data rate carried over the at least a first channel wavelength and a data rate carried over the at least a second channel wavelength is within the predetermined equalization range.

Preferably, in order to transfer data from the at least a first channel wavelength in the sub-group to the at least a second channel wavelength in the sub-group, the optical cross-connect fabric 410 switches a portion of the data carried over the at least a first channel wavelength in the sub-group to the at least a second channel wavelength in the sub-group under control of the processing unit 420. Since, as mentioned above, the switching speed of the optical cross-connect fabric 410 is of the order of a few milliseconds, the predetermined equalization range may be of the order of 0.5% of a highest data rate of the data carried over the channel wavelengths in the at least a sub-group of the N channel wavelengths. It is appreciated that the predetermined equalization range may be refined if the switching speed of the optical cross-connect fabric 410 is increased.

In an example shown in FIG. 6, the equalization is achieved by an averaging technique in which data is respectively transferred from channel wavelengths CH. 2 and CH. 8 that carry data at 20 Gb/s to channel wavelengths CH. 6 and CH. 7 that carry data at 2.5 Gb/s until the data rate of data carried over each of the channel wavelengths CH. 2, CH. 6, CH. 7 and CH. 8 reaches the average value of 11.25 Gb/s thereby obtaining a zero data rate difference level, i.e., exact equalization. It is appreciated that in such a case, data is only rerouted between the channel wavelengths CH. 2, CH. 6, CH. 7, and CH. 8, and there is no need for feeding data back to the routing apparatus 405 over a return path and generating a delay time period as described above with reference to FIG. 5. However, it is appreciated that other equalization techniques may be applied which may require use of the return path for feeding data back to the routing apparatus 405. Additionally, it is appreciated that equalization techniques that may result in a non-zero data rate difference level may be also applied.

Preferably, the equalization of the data rates carried over the at least a sub-group of the N channel wavelengths may be performed whenever differences between data rates of data carried over some of the N channel wavelengths is greater than a threshold, such as 5 Gb/s. Alternatively, equalization of the data rates carried over the at least a sub-group of the N channel wavelengths may be performed, for example, in response to detection of interference between some of the N channel wavelengths. Preferably, the interference between some of the N channel wavelengths may be detected by the detector unit 430.

It is appreciated that since a quality of communication over a channel wavelength is dependent upon a data rate of data carried over the channel wavelength, equalization of data rates carried over the at least a sub-group of the N channel wavelengths may be used to improve the quality of communication.

Figure 7:
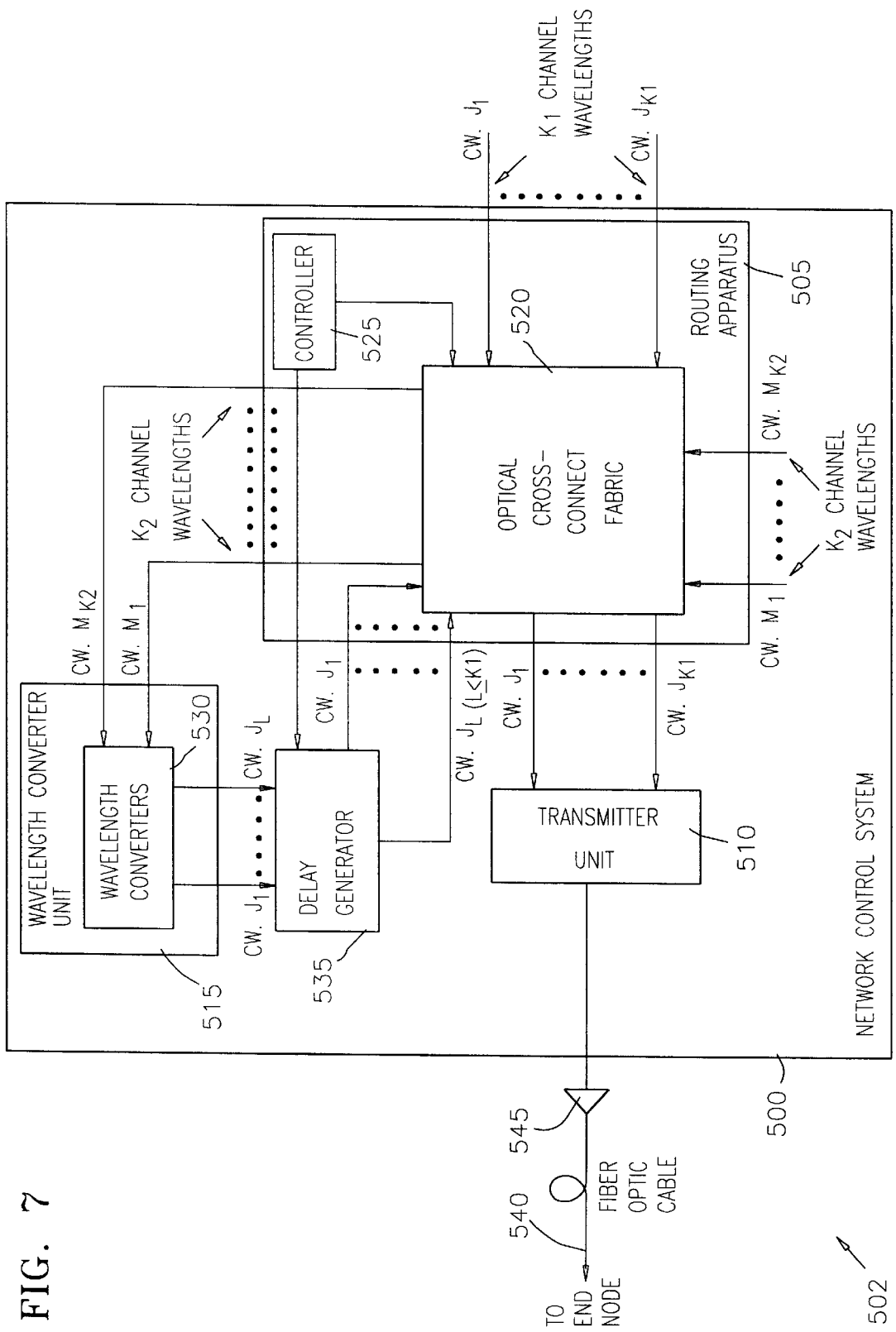
FIG. 7 is a simplified block diagram illustration of still another preferred implementation of a network control system which may be implemented either at a node serving terminal or at an end node of a communication network which utilizes wavelength division multiplexing, the network control system being constructed and operative in accordance with a preferred embodiment of the present invention.

Reference is now made to FIG. 7 which is a simplified block diagram illustration of still another preferred implementation of a network control system 500 constructed and operative in accordance with a preferred embodiment of the present invention. The network control system 500 may preferably be implemented at a node serving terminal (not shown) of a communication network 502 which utilizes WDM.

Preferably, the network control system 500 is employed to control transmission of optical signals multiplexed by WDM to an end node (not shown) of the communication network 502. The network control system 500 preferably includes routing apparatus 505, a transmitter unit 510 and a wavelength converter unit 515. The routing apparatus 505 is preferably operatively associated with the transmitter unit 510 and the wavelength converter unit 515.

The routing apparatus 505 preferably includes an optical cross-connect fabric 520, such as the optical cross-connect fabric 410 of FIG. 5. The optical cross-connect fabric 520 is preferably controlled by a controller 525 and is operative to receive first optical signals carried over $K_1$ channel wavelengths indicated by $J_1, \ldots J_{K_1}$, and second optical signals carried over $K_2$ channel wavelengths indicated by $M_1, \ldots M_{K_2}$, which are different from the $K_1$ channel wavelengths. However, it is appreciated that only the $K_1$ channel wavelengths are used for communication with the end node.

Preferably, the controller 525 may configure the optical cross-connect fabric 520 so that the optical cross-connect fabric 520 provides the second optical signals carried over the $M_1, \ldots M_{K2}$ channel wavelengths to the wavelength converter unit 515, and the first optical signals carried over the $J_1, \ldots J_{K1}$ channel wavelengths to the transmitter unit 510 for transmission thereby.

The wavelength converter unit 515 preferably includes a series of wavelength converters 530 which are operative to change the $K_2$ channel wavelengths of the second optical signals to at least one of the $K_1$ channel wavelengths thereby to form converted optical signals. In an example depicted in FIG. 7, the at least one of the $K_1$ channel wavelengths may include the channel wavelengths indicated by CW. $J_1, \ldots$, CW. $J_L$, where L is an integer number less than or equal to $K_1$.

Preferably, the converted optical signals carried over the at least one of the $K_1$ channel wavelengths are provided back to the optical cross-connect fabric 520 via a delay generator 535 which is similar to the delay generator 440 of FIG. 5 and is operative to delay the converted optical signals by a suitable delay time period determined by the controller 525. The structure and functionality of the delay generator 535 is described herein below with reference to FIGS. 8A and 8B.

The optical cross-connect fabric 520 preferably provides the converted optical signals carried over the at least one of the $K_1$ channel wavelengths to the transmitter unit 510 which is operative to transmit the converted optical signals, as well as the first optical signals, in a wavelength division multiplexed form to the end node via a fiber optic cable 540. Preferably, an optical amplifier 545 amplifies the optical signals transmitted to the end node.

The transmitter unit 510 is preferably operative to transmit the converted optical signals in one of the two following modes:

(a) together with the first optical signals and over the $K_1$ channel wavelengths if a combination of the converted optical signals and the first optical signals does not exceed a channel data rate threshold on each of the $K_1$ channel wavelengths; and (b) after transmission of the first optical signals and over the at least one of the $K_1$ channel wavelengths if a combination of the converted optical signals and the first optical signals exceeds the channel data rate threshold on the at least one of the $K_1$ channel wavelengths.

It is appreciated that in mode (b), a suitable delay time period between transmission of the converted optical signals and transmission of the first optical signals may be provided by the delay generator 535 under control of the controller 525 is a similar manner to that described above with reference to FIGS. 2, 3, 5 and 6.

If the suitable delay time period is long, such as of the order of a few seconds or more, the optical cross-connect fabric 520 preferably transmits the converted optical signals to a remote NST (not shown) which may transmit the converted optical signals to the end node via a separate link and a separate route (not shown). Alternatively, the second optical signals carried over the $K_2$ channel wavelengths may be transmitted to the remote NST directly without conversion in the wavelength converter unit 515 if the remote NST is capable of transmitting the optical signals carried over the $K_2$ channel wavelengths.

The operation of the apparatus of FIG. 7 is now briefly described. Preferably, optical signals carried over $K_1+K_2$ channel wavelengths are received at the routing apparatus 505. Since only the $K_1$ channel wavelengths are used for communication with the end node, optical signals carried over the $K_1$ channel wavelengths are transmitted to the end node, and optical signals carried over the $K_2$ channel wavelengths are provided to the wavelength converter unit 515 which is operative to change the $K_2$ channel wavelengths of the optical signals carried over the $K_2$ channel wavelengths to at least one of the $K_1$ channel wavelengths and thereby to form converted optical signals. The converted optical signals may be transmitted to the end node since they are carried over the at least one of the $K_1$ channel wavelengths. Preferably, the converted optical signals are transmitted to the end node by implementing either transmission mode (a) or transmission mode (b) as mentioned above.

It is appreciated that at least some of the apparatuses of FIGS. 1–7 may be combined to provide combined benefits that reduce interference and improve communication performance. For example, the apparatus of FIG. 2 may be combined with the apparatus of FIG. 5 to limit the number of channel wavelengths actually used for transmission of optical signals to an end node and to reduce data rates of data carried over even or odd channel wavelengths.

Figure 8A:
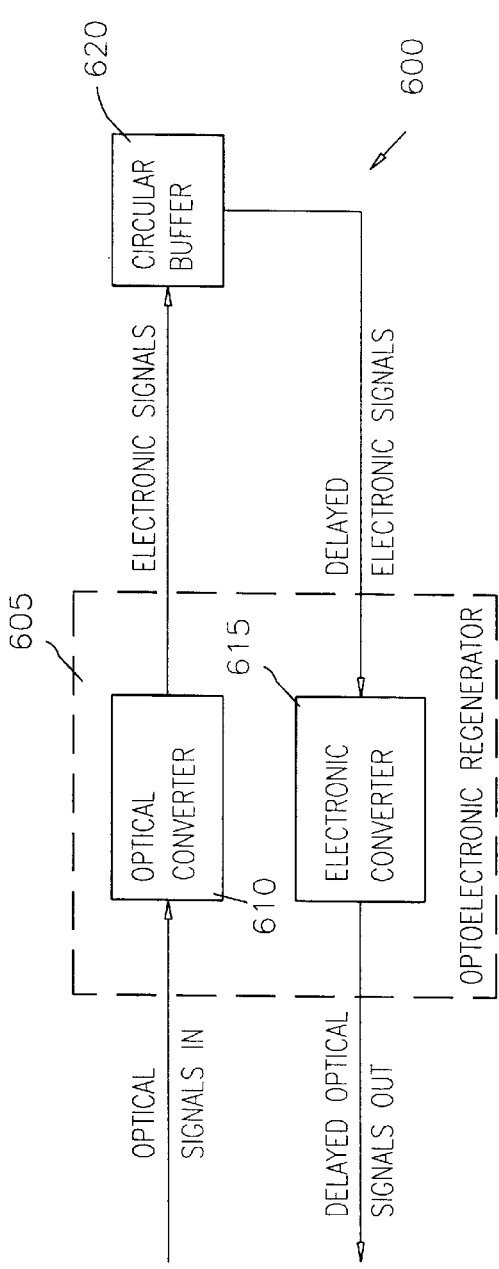
FIG. 8A is a simplified block diagram illustration of a preferred implementation of a delay generator which may be operative with the network control systems of FIGS. 2, 3, and 5–7, the delay generator being constructed and operative in accordance with a preferred embodiment of the present invention.

Reference is now made to FIG. 8A which is a simplified block diagram illustration of a preferred implementation of a delay generator 600 which may be operative with the network control systems of FIGS. 2, 3, and 5–7, the delay generator 600 being constructed and operative in accordance with a preferred embodiment of the present invention. It is appreciated that each of the following delay generators: the delay generator 165 of FIG. 2; the delay generator 250 of FIG. 3; the delay generator 440 of FIGS. 5 and 6; and the delay generator 535 of FIG. 7 may be implemented by the delay generator 600 or a plurality thereof Preferably, the delay generator 600 includes an optoelectronic regenerator 605 which preferably includes an optical converter 610 and an electronic converter 615. The optical converter 610 is typically operative to detect optical signals and to convert the optical signals into electronic signals. The electronic converter 615 is typically operative to amplify electronic signals provided thereto and to use the electronic signals to drive a diode laser which creates optical signals.

The delay generator 600 also preferably includes a circular buffer 620 which is preferably operatively associated with the optoelectronic regenerator 605. The circular buffer 620 is operative to output data provided thereto in a cyclic mode, typically according to a FIFO (First-in-First-out) order, thereby producing a fixed time delay period between data inputted to the circular buffer 620 and data outputted from the circular buffer 620.

The operation of the apparatus of FIG. 8A is now briefly described. Preferably, incoming optical signals that must be delayed are inputted to the optical converter 610 in the optoelectronic regenerator 605. The optical signals are preferably converted into electronic signals and provided to the circular buffer 620.

On exit from the circular buffer 620, the electronic signals are preferably delayed by a cycle time of the circular buffer 620, wherein the cycle time is the time difference between an entry of a signal into the circular buffer 620 and an exit of the same signal from the circular buffer 620. Preferably, the electronic signals delayed by the circular buffer 620 are provided to the electronic converter 615 which outputs a delayed replica of the incoming optical signals.

It is appreciated that by repeatedly re-feeding the delayed replica of the incoming optical signals into the optoelectronic regenerator 605 the incoming optical signals may be delayed by a delay time period which is a multiplication of a number of times the incoming optical signals are fed into the optoelectronic regenerator 605 by the cycle time of the circular buffer 620.

Preferably, the incoming optical signals are fed into the optoelectronic regenerator 605 under control of a conventional controller (not shown) such as the controller 120 of FIG. 2, the controller 220 of FIG. 3, controlling equipment (not shown) in the routing apparatus 405 of FIG. 5, and the controller 505 of FIG. 7. The controller may preferably determine the number of times the incoming optical signals are fed into the optoelectronic regenerator 605 in accordance with a required delay time period.

It is appreciated that the delay generator 600 may be operative with a single channel wavelength carrying optical signals. Preferably, in order to delay optical signals carried over a plurality of channel wavelengths, a plurality of delay generators 600 may be used, each of the plurality of delay generators 600 corresponding to one of the plurality of channel wavelengths. Alternatively, the optical signals carried over the plurality of channel wavelengths may be multiplexed over a single channel wavelength, and multiplexed optical signals carried over the single channel wavelength may be delayed in a single delay generator 600.

Figure 8B:
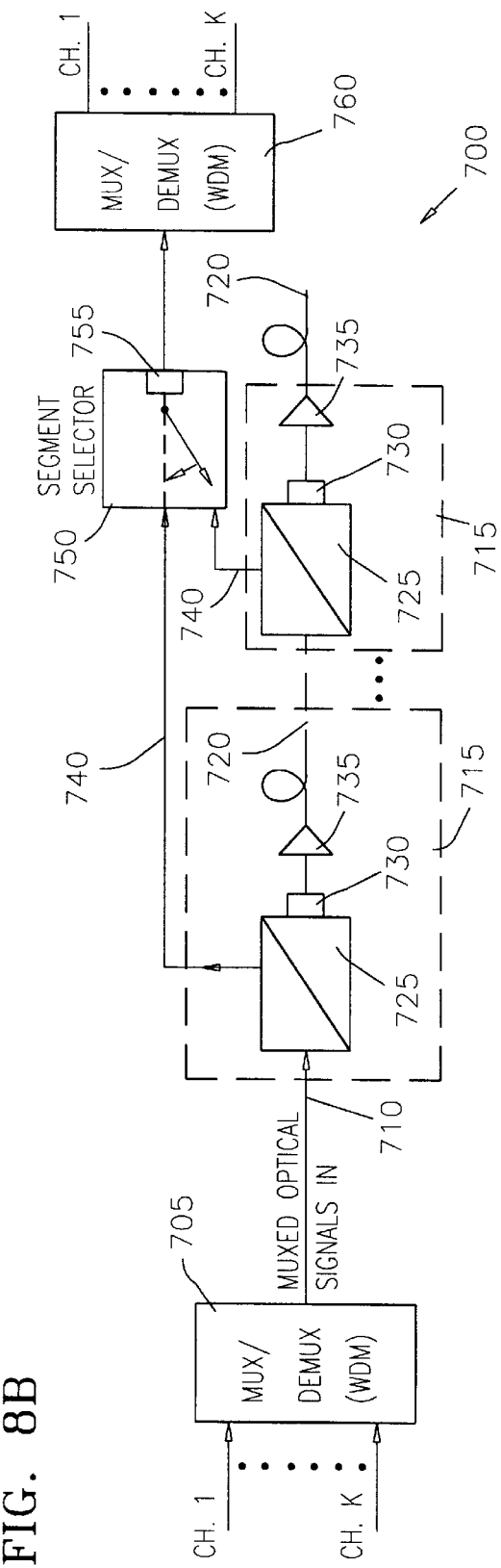
FIG. 8B is a simplified block diagram illustration of another preferred implementation of a delay generator which may be operative with the network control systems of FIGS. 2, 3, and 5–7, the delay generator being constructed and operative in accordance with another preferred embodiment of the present invention.

Reference is now made to FIG. 8B which is a simplified block diagram illustration of another preferred implementation of a delay generator 700 which may be operative with the network control systems of FIGS. 2, 3, and 5–7, the delay generator 700 being constructed and operative in accordance with a preferred embodiment of the present invention. It is appreciated that each of the following delay generators: the delay generator 165 of FIG. 2; the delay generator 250 of FIG. 3; the delay generator 440 of FIGS. 5 and 6; and the delay generator 535 of FIG. 7 may be implemented by the delay generator 700 or a plurality thereof Preferably, the delay generator 700 is adjustable and is operative to delay optical signals by selectable delay time periods. The delay generator 700 may include a MUX/DEMUX 705 which is operative to multiplex optical signals carried over a plurality of channel wavelengths and to feed wavelength division multiplexed optical signals into a fiber optic cable 710. It is appreciated that if optical signals carried over one channel wavelength only must be delayed, the MUX/DEMUX 705 may be optional.

Preferably, wavelength division multiplexed optical signals outputted by the MUX/DEMUX 705 are provided to a plurality of delay segments 715 connected in series. Preferably, each delay segment 715 includes the following elements: a fiber optic cable 720 of predetermined length which is operative to pass the optical signals; a beam-splitter 725 which is coupled to the fiber optic cable 720 and is operative to transmit and reflect the optical signals at selected proportions; and a coupler 730 which is operative to couple each delay segment 715 to a fiber optic cable 720 of an adjacent delay segment 715. It is appreciated that each beam-splitter 725 may include a conventional optical decoupler, such as a star decoupler (not shown) having two branches.

Preferably, each of the delay segments 715 may also include a fiber amplifier 735 which is used to amplify optical signals carried by the fiber optic cable 720. The fiber amplifier 735 may preferably include a conventional fiber amplifier, such as an EDFA for wavelengths around 1550 nm.

It is appreciated that each of the delay segments 715 may also preferably include a fiber optic cable 740 which is operative to carry optical signals reflected by the beam-splitter 725. In a case that the beam-splitter 725 includes a two-branch decoupler, the fiber optic cable 740 preferably includes one of the branches of the two-branch decoupler.

Preferably, all the fiber optic cables 740 are coupled to a segment selector 750 which is operative to direct optical signals emanating from a beam-splitter 725 of a selected delay segment 715 to an output port 755. The segment selector 750 may include, for example, a mechanical switch or an optical switch. It is appreciated that the segment selector 750 may be controlled by a controller (not shown) which preferably selects the selected delay segment 715.

Preferably, the segment selector 750 is coupled to a MUX/DEMUX 760 via the output port 755. The MUX/DEMUX 760 is preferably operative to separate optical signals outputted via the output port 755.

The operation of the apparatus of FIG. 8B is now briefly described. Preferably, optical signals carried over a plurality of channel wavelengths are multiplexed by WDM and fed in a wavelength division multiplexed form to the plurality of delay segments 715. The optical signals may be outputted at each beam-splitter 725 which creates a junction at which the optical signals may be extracted.

Preferably, a selection of a delay segment 715 at which the optical signals are extracted defines a delay path whose length determines a delay time period achieved by allowing the optical signals to travel along the delay path. Thus, a determination of a required delay time period by the controller determines a selected delay segment 715 at which the optical signals must be outputted and consequently a position of the segment selector 750 which allows output of the optical signals from the selected delay segment 715. It is appreciated that the length of the delay path may be of the order of a few kilometers that may be equivalent to a distance to a remote NST.

Preferably, delayed optical signals outputted via the segment selector 750 are separated in the MUX/DEMUX 760 to generate a delayed replica of the optical signals carried over the plurality of channel wavelengths which are multiplexed by WDM at the MUX/DEMUX 705. It is appreciated that since the optical signals are amplified along the delay segments 715, no substantial loss of light intensity is created.

It is further appreciated that the length of the delay path may be doubled if the optical signals are allowed to be reflected at the end of the delay path and to travel back to the MUX/DEMUX 705 which may receive and separate reflected optical signals.

Figure 9:
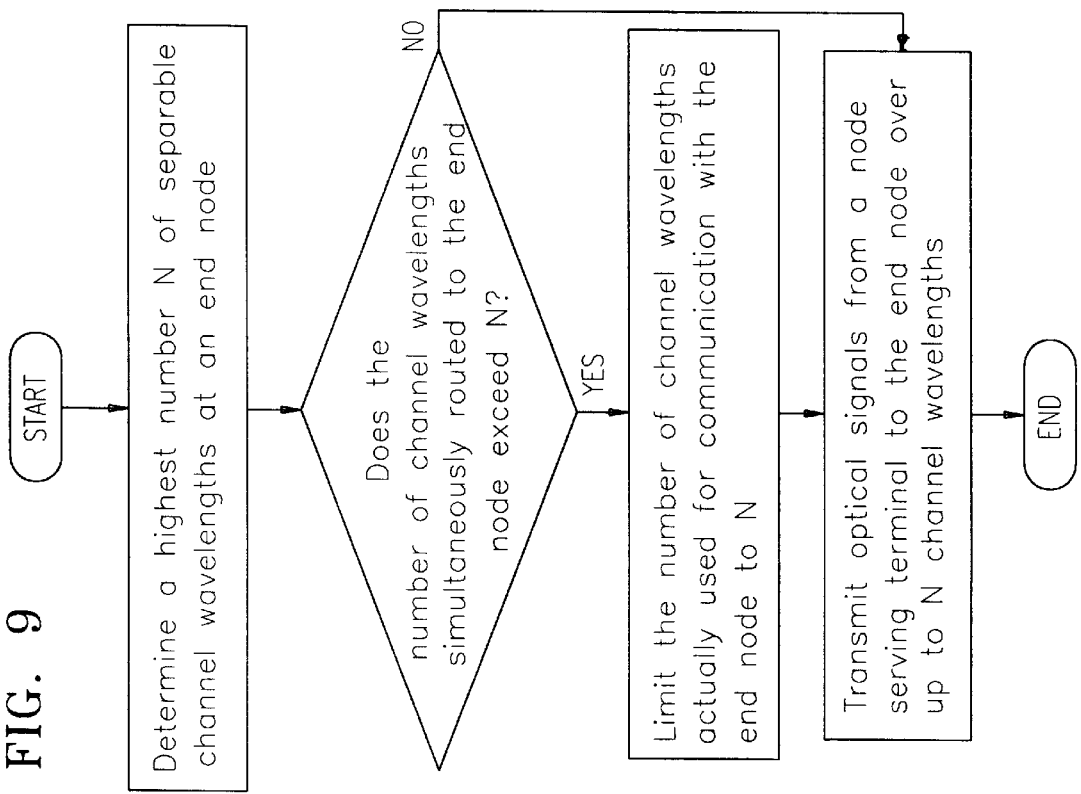
FIG. 9 is a simplified flow chart illustration of a preferred method of operation of the apparatuses of FIGS. 1–3.

Reference is now made to FIG. 9 which is a simplified flow chart illustration of a preferred method of operation of the apparatuses of FIGS. 1–3.

Preferably, a communication network in which a node serving terminal communicates optical signals multiplexed by wavelength division multiplexing WDM with an end node via a fiber optic cable is provided.

Preferably, prior to transmitting the optical signals multiplexed by wavelength division multiplexing from the NST to the end node, a highest number N of separable channel wavelengths at the end node is determined. Following a determination of the number N, a number of channel wavelengths actually used for substantially simultaneously communicating the optical signals via the fiber optic cable to the end node is preferably limited to N channel wavelengths.

Figure 10:
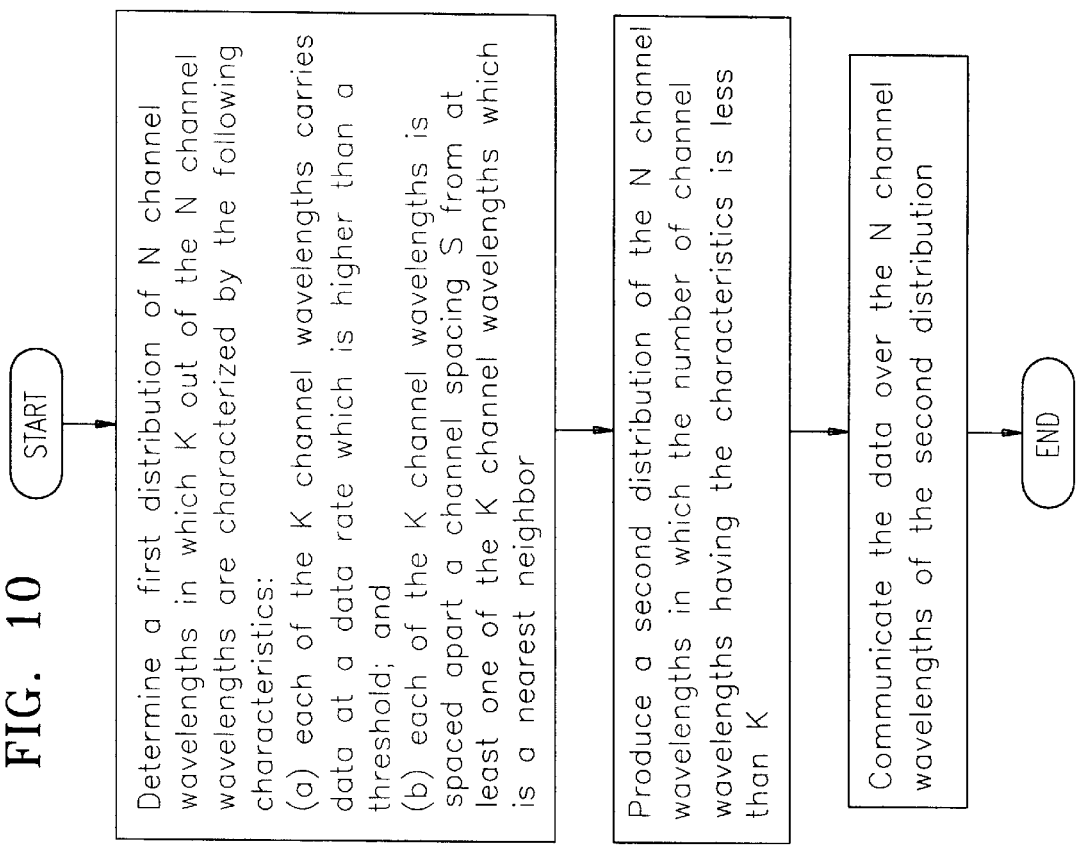
FIG. 10 is a simplified flow chart illustration of a preferred method of operation of the apparatus of FIG. 4.

Reference is now made to FIG. 10 which is a simplified flow chart illustration of a preferred method of operation of the apparatus of FIG. 4.

Preferably, a communication network which utilizes WDM of N channel wavelengths carrying data at various data rates and having the channel wavelengths spaced apart a channel spacing S from each other is provided.

Preferably, a determination is performed of a first distribution of the N channel wavelengths in which K out of the N channel wavelengths are each characterized by the following characteristics: (a) each of the K channel wavelengths carries data at a data rate which is higher than a threshold, and (b) each of the K channel wavelengths is spaced apart the channel spacing S from at least one of the K channel wavelengths which is a nearest neighbor.

Following the determination of the first distribution, a second distribution of the N channel wavelengths is produced. In the second distribution the number of channel wavelengths having the above mentioned characteristics is preferably less than K. Then, the data is communicated over the N channel wavelengths of the second distribution.

Figure 11:
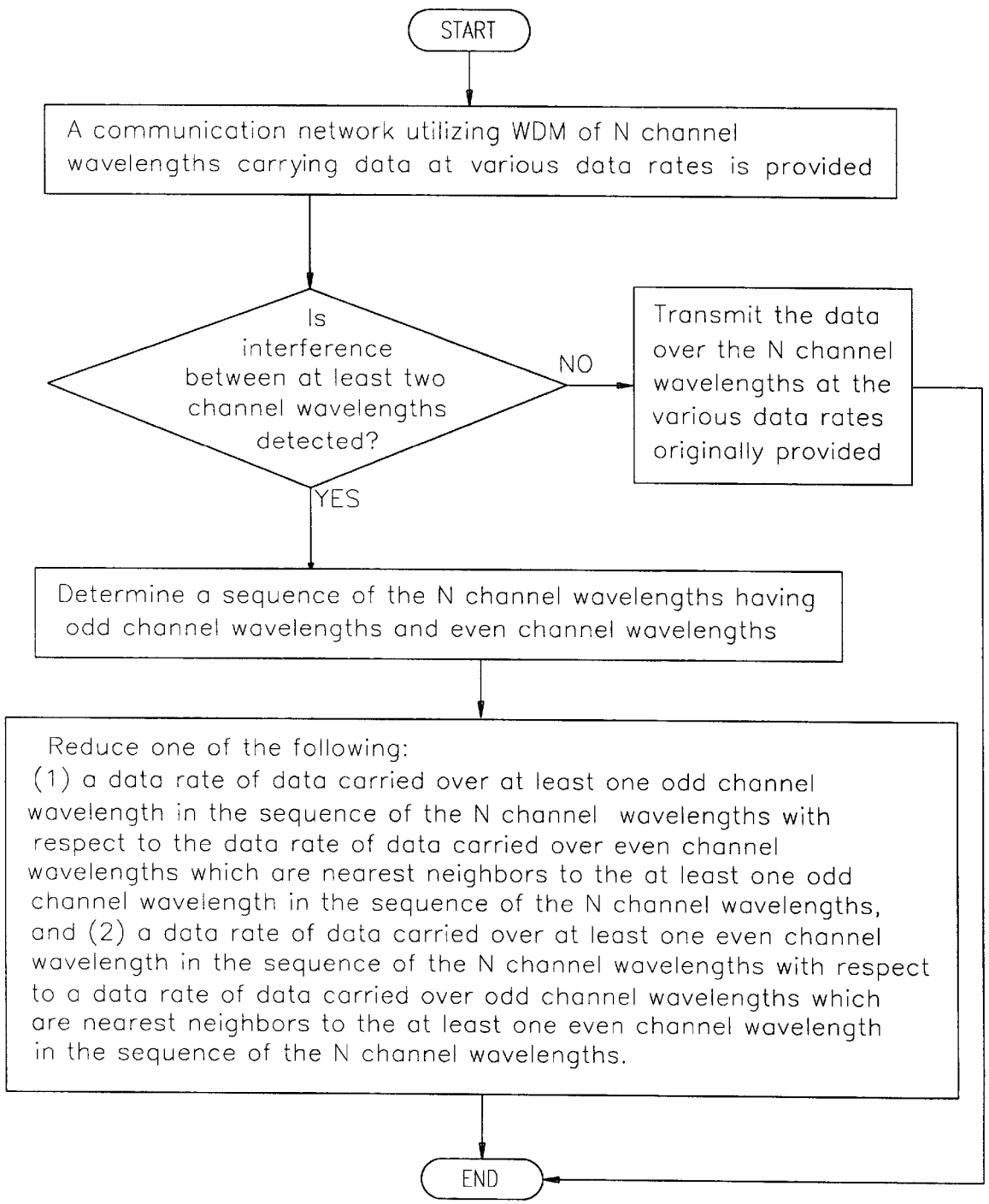
FIG. 11 is a simplified flow chart illustration of a preferred method of operation of the apparatus of FIG. 5.

Reference is now made to FIG. 11 which is a simplified flow chart illustration of a preferred method of operation of the apparatus of FIG. 5.

Preferably, a communication network which utilizes WDM of N channel wavelengths carrying data at various data rates is provided. When interference between at least two of the N channel wavelengths is detected, a sequence of the N channel wavelengths having odd channel wavelengths and even channel wavelengths is preferably determined. Then, a reduction of one of the following is performed: (a) a data rate of data carried over at least one odd channel wavelength in the sequence of the N channel wavelengths with respect to a data rate of data carried over even channel wavelengths which are nearest neighbors to the at least one odd channel wavelength in the sequence of the N channel wavelengths, and (b) a data rate of data carried over at least one even channel wavelength in the sequence of the N channel wavelengths with respect to a data rate of data carried over odd channel wavelengths which are nearest neighbors to the at least one even channel wavelength in the sequence of the N channel wavelengths.

Figure 12:
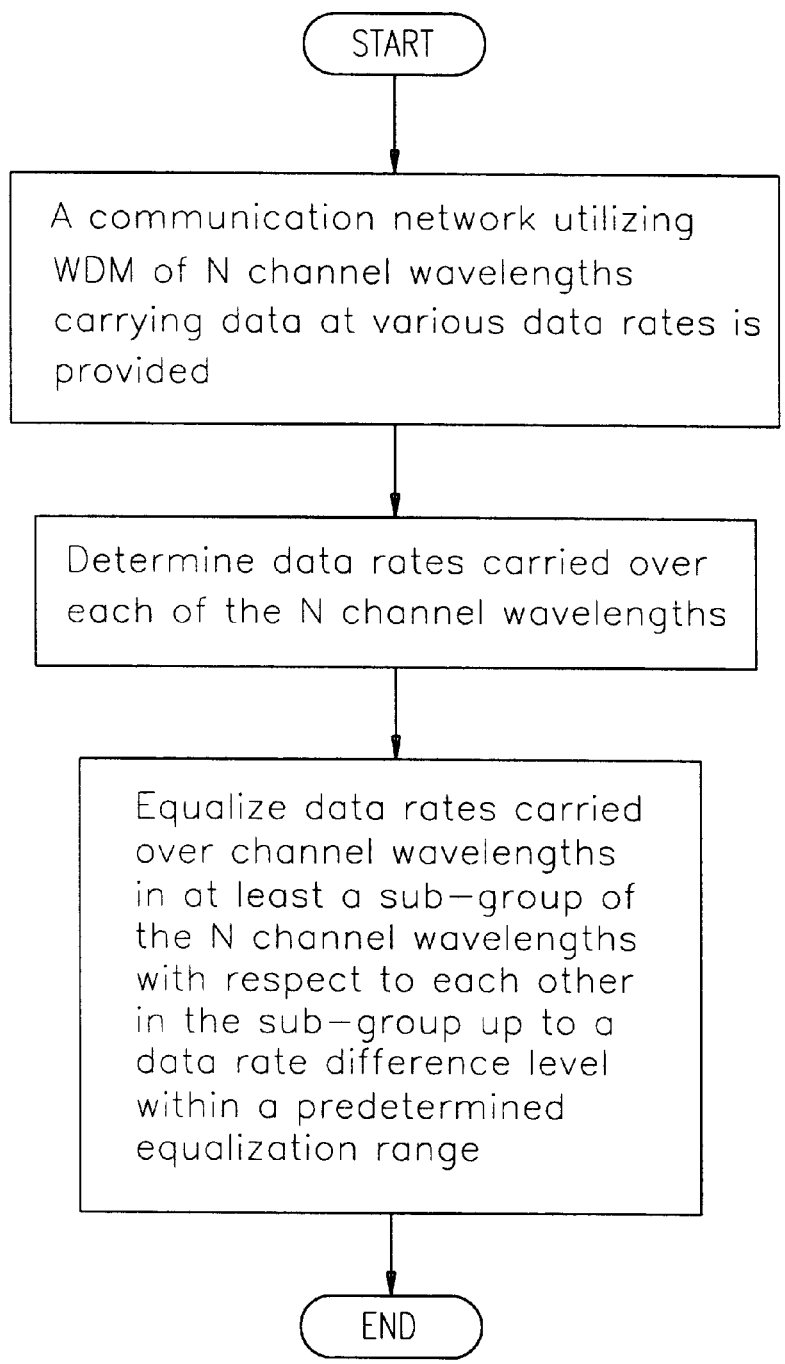
FIG. 12 is a simplified flow chart illustration of a preferred method of operation of the apparatus of FIG. 6.

Reference is now made to FIG. 12 which is a simplified flow chart illustration of a preferred method of operation of the apparatus of FIG. 6.

Preferably, a communication network which utilizes WDM of N channel wavelengths carrying data at various data rates is provided. Further preferably, data rates carried over each of the N channel wavelengths are determined. Then, data rates carried over channel wavelengths in at least a sub-group of the N channel wavelengths are equalized with respect to each other in the sub-group up to a data rate difference level within a predetermined equalization range.

Figure 13:
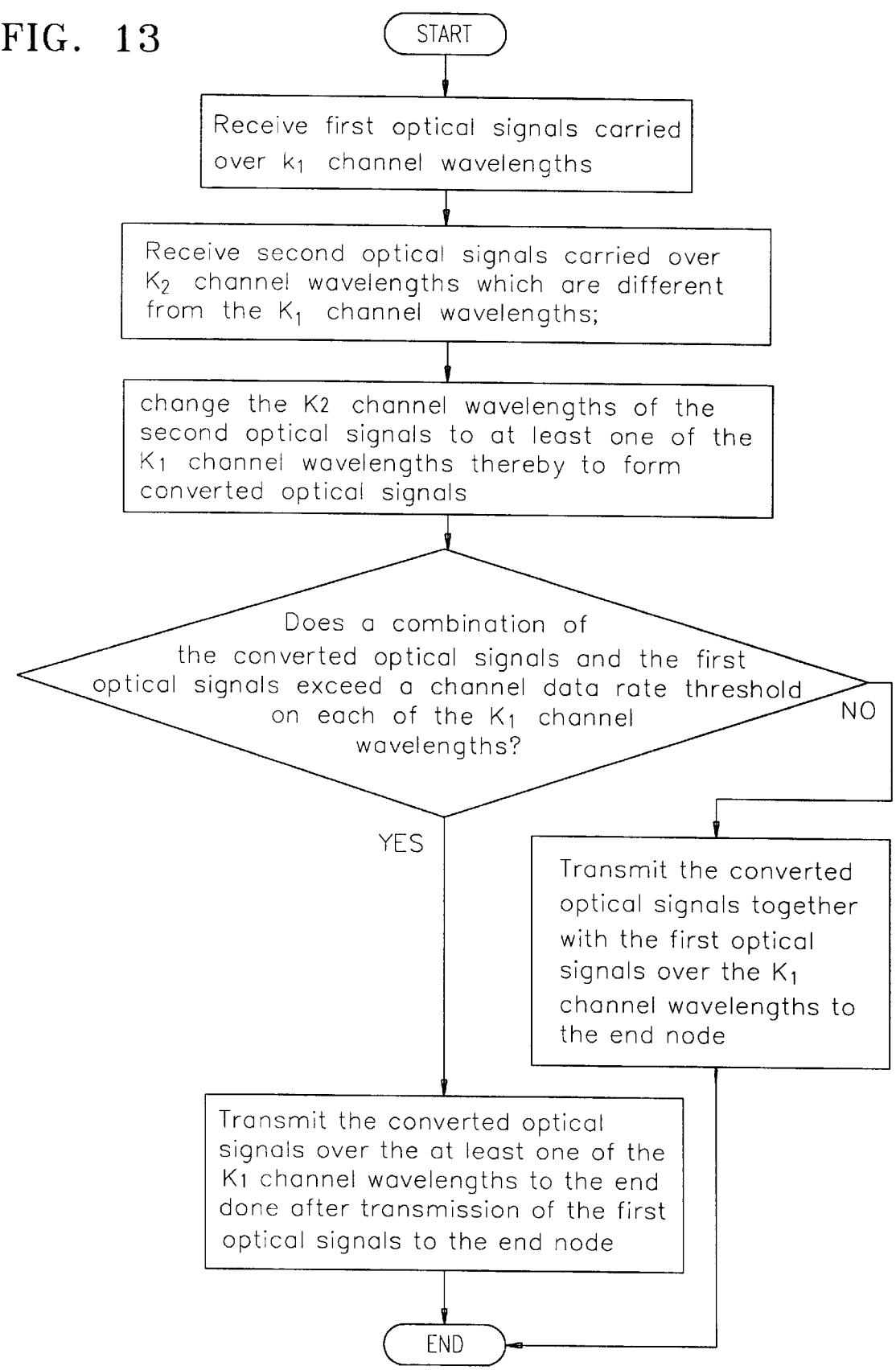
FIG. 13 is a simplified flow chart illustration of a preferred method of operation of the apparatus of FIG. 7.

Reference is now made to FIG. 13 which is a simplified flow chart illustration of a preferred method of operation of the apparatus of FIG. 7.

Preferably, a communication network which transmits optical signals multiplexed by WDM to an end node is provided. Further preferably, first optical signals carried over $K_1$ channel wavelengths, and second optical signals carried over $K_2$ channel wavelengths which are different from the $K_1$ channel wavelengths are received at a network control system. Then, the $K_2$ channel wavelengths of the second optical signals are changed to at least one of the $K_1$ channel wavelengths thereby to form converted optical signals.

Preferably, the converted optical signals are transmitted to the end node in one of the two following transmission modes: (a) together with the first optical signals and over the $K_1$ channel wavelengths if a combination of the converted optical signals and the first optical signals does not exceed a channel data rate threshold on each of the $K_1$ channel wavelengths, and (b) after transmission of the first optical signals and over the at least one of the $K_1$ channel wavelengths if a combination of the converted optical signals and the first optical signals exceeds the channel data rate threshold on the at least one of the $K_1$ channel wavelengths.

The methods described herein above with reference to FIGS. 9–13 may be combined to reduce interference and improve communication performance. For example, the number of channel wavelengths actually used for transmission of optical signals to an end node may be limited, and also data rates of data carried over channel wavelengths may be equalized.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims which follow.

What is claimed is:

1. A network control method for use with a communication network in which a node serving terminal (NST) communicates optical signals multiplexed by wavelength division multiplexing (WDM) with an end node via a fiber optic cable, the method comprising:

determining a highest number N of separable channel wavelengths at the end node; and limiting a number of channel wavelengths actually used for substantially simultaneously communicating the optical signals via the fiber optic cable to the end node to said number N.

2. A method according to claim 1 and wherein said determining step comprises:

obtaining the number of channel wavelengths N at one of the NST and the end node upon installation of channel wavelength separating equipment at a service area of the end node; and providing the number of channel wavelengths N to the NST if the number of channel wavelengths N is obtained at the end node.

3. A method according to claim 1 and wherein said determining step comprises the step of transmitting control information including a determination of said number N from the end node to the NST.

4. A method according to claim 1 and wherein said limiting step comprises the step of filtering channel wavelengths routed to the end node to enable substantially simultaneous transmission of no more than N channel wavelengths in total within at least one bandwidth.

5. A method according to claim 4 and also comprising the step of converting at least one channel wavelength outside the at least one bandwidth to at least one of said N channel wavelengths.

6. A method according to claim 1 and wherein said limiting step comprises the steps of:

transmitting optical signals carried over up to N channel wavelengths from the NST to the end node;

changing channel wavelengths of optical signals carried over channel wavelengths other than the N channel wavelengths to at least one of the N channel wavelengths thereby to form converted optical signals; and transmitting said converted optical signals over said at least one of the N channel wavelengths from the NST to the end node after said step of transmitting optical signals carried over up to N channel wavelengths from the NST to the end node.

7. A method according to claim 1 and wherein said limiting step comprises the steps of:
determining N channel wavelengths to be actually used for substantially simultaneously communicating the optical signals to the end node via the fiber optic cable;
changing channel wavelengths of optical signals carried over channel wavelengths other than the N channel wavelengths to at least one of the N channel wavelengths thereby to form converted optical signals,
combining said converted optical signals carried over said at least one of the N channel wavelengths and optical signals carried over said N channel wavelengths to form combined optical signals; and
transmitting said combined optical signals over said N channel wavelengths from the NST to the end node.

8. A network control method for use with a communication network utilizing WDM of N channel wavelengths carrying data at various data rates and having the channel wavelengths spaced apart a channel spacing S from each other, the method comprising:
determining a first distribution of the N channel wavelengths in which K out of the N channel wavelengths are each characterized by the following characteristics: (a) each of the K channel wavelengths carries data at a data rate which is higher than a threshold; and (b) each of the K channel wavelengths is spaced apart the channel spacing S from at least one of the K channel wavelengths which is a nearest neighbor;
producing a second distribution of the N channel wavelengths in which the number of channel wavelengths having said characteristics is less than K; and
communicating the data over the N channel wavelengths of the second distribution.

9. A network control method for use with a communication network utilizing WDM of N channel wavelengths carrying data at various data rates, the method comprising:
detecting an interference between at least two of the N channel wavelengths;
determining a sequence of the N channel wavelengths having odd channel wavelengths and even channel wavelengths; and
reducing one of the following:
a data rate of data carried over at least one odd channel wavelength in said sequence of the N channel wavelengths with respect to a data rate of data carried over even channel wavelengths which are nearest neighbors to said at least one odd channel wavelength in said sequence of the N channel wavelengths, and
a data rate of data carried over at least one even channel wavelength in said sequence of the N channel wavelengths with respect to a data rate of data carried over odd channel wavelengths which are nearest neighbors to said at least one even channel wavelength in said sequence of the N channel wavelengths.

10. A method according to claim 9 and wherein said reducing step comprises the step of reducing said data rate until interference between said at least two of the N channel wavelengths falls below an acceptable interference level.

11. A network control method for use with a communication network utilizing WDM of N channel wavelengths carrying data at various data rates, the method comprising:
determining data rates carried over each of said N channel wavelengths; and
equalizing data rates carried over channel wavelengths in at least a sub-group of the N channel wavelengths with respect to each other in the sub-group up to a data rate difference level within a predetermined equalization range.

12. A method according to claim 11 and wherein said equalizing step comprises the step of transferring data from at least a first channel wavelength in the sub-group which carries data at a first data rate to at least a second channel wavelength in the sub-group which carries data at a second data rate being lower than the first data rate until a difference between a data rate of data carried over the at least a first channel wavelength and a data rate of data carried over the at least a second channel wavelength is within said predetermined equalization range.

13. A network control system in a node serving terminal which communicates optical signals multiplexed by wavelength division multiplexing with an end node via a fiber optic cable, the network control system comprising:
routing apparatus capable of substantially simultaneously communicating the optical signals over a plurality of channel wavelengths via the fiber optic cable; and
limiting apparatus, operatively associated with said routing apparatus, and operative to limit a number of channel wavelengths actually used by the routing apparatus for substantially simultaneously communicating the optical signals to the end node via the fiber optic cable to a highest number N of separable channel wavelengths at the end node.

14. A system according to claim 13 and wherein said limiting apparatus comprises a bandpass filter substantially transparent only to optical signals transmitted over up to N channel wavelengths in total within at least one bandwidth.

15. A system according to claim 13 and wherein said limiting apparatus comprises a controller operative to select N channel wavelengths from said plurality of channel wavelengths, and to prevent routing of channel wavelengths other than the N channel wavelengths together with said N channel wavelengths.

16. A system according to claim 15 and wherein said limiting apparatus also comprises one of the following routers:
an N-channel router operatively associated with said controller and operative to substantially simultaneously route up to N channel wavelengths; and
a router operatively associated with said controller and operative to substantially simultaneously route a number of channel wavelengths determined by said controller.

17. A system according to claim 13 and also comprising a wavelength converter unit operative to convert at least one of said plurality of channel wavelengths not included in the N channel wavelengths to at least one of said N channel wavelengths.

18. A network control system in a communication network utilizing WDM of N channel wavelengths carrying data at various data rates and having the channel wavelengths spaced apart a channel spacing S from each other, the system comprising:
a controller comprising:
determination apparatus operative to determine a first distribution of said N channel wavelengths in which K out of the N channel wavelengths are each characterized by the following characteristics: (a) each of the K channel wavelengths carries data at a data rate which is higher than a threshold; and (b) each of the K channel wavelengths is spaced apart the channel spacing S from at least one of the K channel wavelengths which is a nearest neighbor, and a processing unit, operatively associated with said determination apparatus, and operative to produce a second distribution of said N channel wavelengths in which the number of channel wavelengths having said characteristics is less than K; and a router operatively associated with the controller and operative to reroute the data from the N channel wavelengths of the first distribution to the N channel wavelengths of the second distribution.

19. A network control system in a communication network utilizing WDM of N channel wavelengths carrying data at various data rates, the system comprising:

a detector unit operative to detect an interference between at least two of the N channel wavelengths;

determination apparatus operative to determine a sequence of the N channel wavelengths having odd channel wavelengths and even channel wavelengths; and a processing unit operatively associated with said determination apparatus and said detector unit and operative to cause a reduction of one of the following:
  a data rate of data carried over at least one odd channel wavelength in said sequence of the N channel wavelengths with respect to a data rate of data carried over even channel wavelengths which are nearest neighbors to said at least one odd channel wavelength in said sequence of the N channel wavelengths, and
  a data rate of data carried over at least one even channel wavelength in said sequence of the N channel wavelengths with respect to a data rate of data carried over odd channel wavelengths which are nearest neighbors to said at least one even channel wavelength in said sequence of the N channel wavelengths.

20. A network control system in a communication network utilizing WDM of N channel wavelengths carrying data at various data rates, the system comprising:

determination apparatus operative to determine data rates carried over each of said N channel wavelengths; and a processing unit operatively associated with said determination apparatus and operative to equalize data rates carried over channel wavelengths in at least a sub-group of the N channel wavelengths with respect to each other in the sub-group up to a data rate difference level within a predetermined equalization range.

21. A network control system for controlling transmission of optical signals multiplexed by wavelength division multiplexing to an end node of a communication network, the system comprising:

routing apparatus operative to receive first optical signals carried over $K_1$ channel wavelengths, and second optical signals carried over $K_2$ channel wavelengths which are different from the $K_1$ channel wavelengths;

a wavelength converter unit operatively associated with said routing apparatus and operative to change said $K_2$ channel wavelengths of said second optical signals to at least one of said $K_1$ channel wavelengths thereby to form converted optical signals; and a transmitter unit operatively associated with said routing apparatus and operative to transmit said converted optical signals to the end node in one of the two following transmission modes: (a) together with said first optical signals and over said $K_1$ channel wavelengths if a combination of said converted optical signals and said first optical signals does not exceed a channel data rate threshold on each of said $K_1$ channel wavelengths, and (b) after transmission of said first optical signals and over said at least one of the $K_1$ channel wavelengths if a combination of said converted optical signals and said first optical signals exceeds the channel data rate threshold on said at least one of the $K_1$ channel wavelengths.

* * * * *